United States Patent
Chida et al.

(10) Patent No.: US 6,938,012 B2
(45) Date of Patent: Aug. 30, 2005

(54) METHOD, APPARATUS AND PROGRAM FOR QUANTITATIVE COMPETITION AND RECORDING MEDIUM HAVING RECORDED THEREON THE PROGRAM

(75) Inventors: Koji Chida, Yokohama (JP); Kunio Kobayashi, Yokohama (JP); Hikaru Morita, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 557 days.

(21) Appl. No.: 10/050,541

(22) Filed: Jan. 18, 2002

(65) Prior Publication Data

US 2002/0095354 A1 Jul. 18, 2002

(30) Foreign Application Priority Data

Jan. 18, 2001 (JP) ........................................ 2001-010327

(51) Int. Cl.$^7$ .............................................. G06F 17/60
(52) U.S. Cl. ........................................................ 705/37
(58) Field of Search ..................................... 705/26, 37

(56) References Cited

U.S. PATENT DOCUMENTS 6,443,841 B1 * 9/2002 Rossides ...................... 463/25
2001/0056396 A1 * 12/2001 Goino .......................... 705/37

FOREIGN PATENT DOCUMENTS

EP      1071025 A2 * 1/2001    ........... G06F/17/60

OTHER PUBLICATIONS

Kobayashi et al. "Efficient Sealed–Bid Auction by Using One–Way Functions" Jan. 2001, Communications and Computer Science vol. E84A, No. 1, p. 289–94 (Dialog File 2, #6837666).*

Le et al. "A Public Key Extension to the Common Cryptographic Architecture" 1993, IBM Systems Journal, v23n3, pp:461–485, (Dialog file 15, #00759575).*

M2 Presswire "The Development of Japan's First Electronic Bidding System Capable of Proving the Authenticity of a transaction to third parties; To be Adopted by Yokosuka City as First Electronic Bidding System in Japanese Local Governments" Apr. 2001.*

* cited by examiner

*Primary Examiner*—Lynda Jasmin
(74) *Attorney, Agent, or Firm*—Oblon, Spivak, McClelland, Maier & Neustadt, P.C.

(57) ABSTRACT

Numbers 1, 2, ..., M are assigned to bidding prices from the minimum to maximum values $V_1$ to $V_N$. For a bidding value $V_{vi}$ each user 11-$i$ generates two sequences of information $s_i = \{s_{i,1}, s_{i,2}, \ldots, s_{i,M}\}$ and $t_i = \{t_{i,1}, t_{i,2}, \ldots, t_{i,M}\}$ such that $s_{i,1} = t_{i,1}, \ldots, s_{i,vi-1} = t_{i,vi-1}, s_{i,vi} \neq t_{i,vi}, \ldots, s_{i,M} \neq t_{i,M}$, then secretly sends the two sequences of information $s_i$ and $t_i$ to quantitative competition apparatuses 15A and 15B, respectively, and sends hash values $H1_i = h(s_i)$ and $H2_i = h(t_i)$ of the two sequences of information $s_i$ and $t_i$ and a hash value $h(V_{vi} \| r_i)$ containing an intended value $V_{vi}$ to a bulletin board apparatus 21. The quantitative competition apparatuses 15A and 15B extract w-th elements $s_{i,w}$ from respective sequences $s_1$ to $s_N$ and w-th elements $t_{i,w}$ from respective sequences $t_1$ to $t_N$, then create a concatenation $Seq_{s,w}$ of N elements $s_{i,w}$ and a concatenation $Seq_{t,w}$ of N elements $t_{i,w}$, then compare them using a one-way function without revealing their values, and, if they differ, deciding that the intended value $V_{vi}$ equal to or smaller than a value $V_w$ is present, and determines the minimum value by changing w.

23 Claims, 7 Drawing Sheets

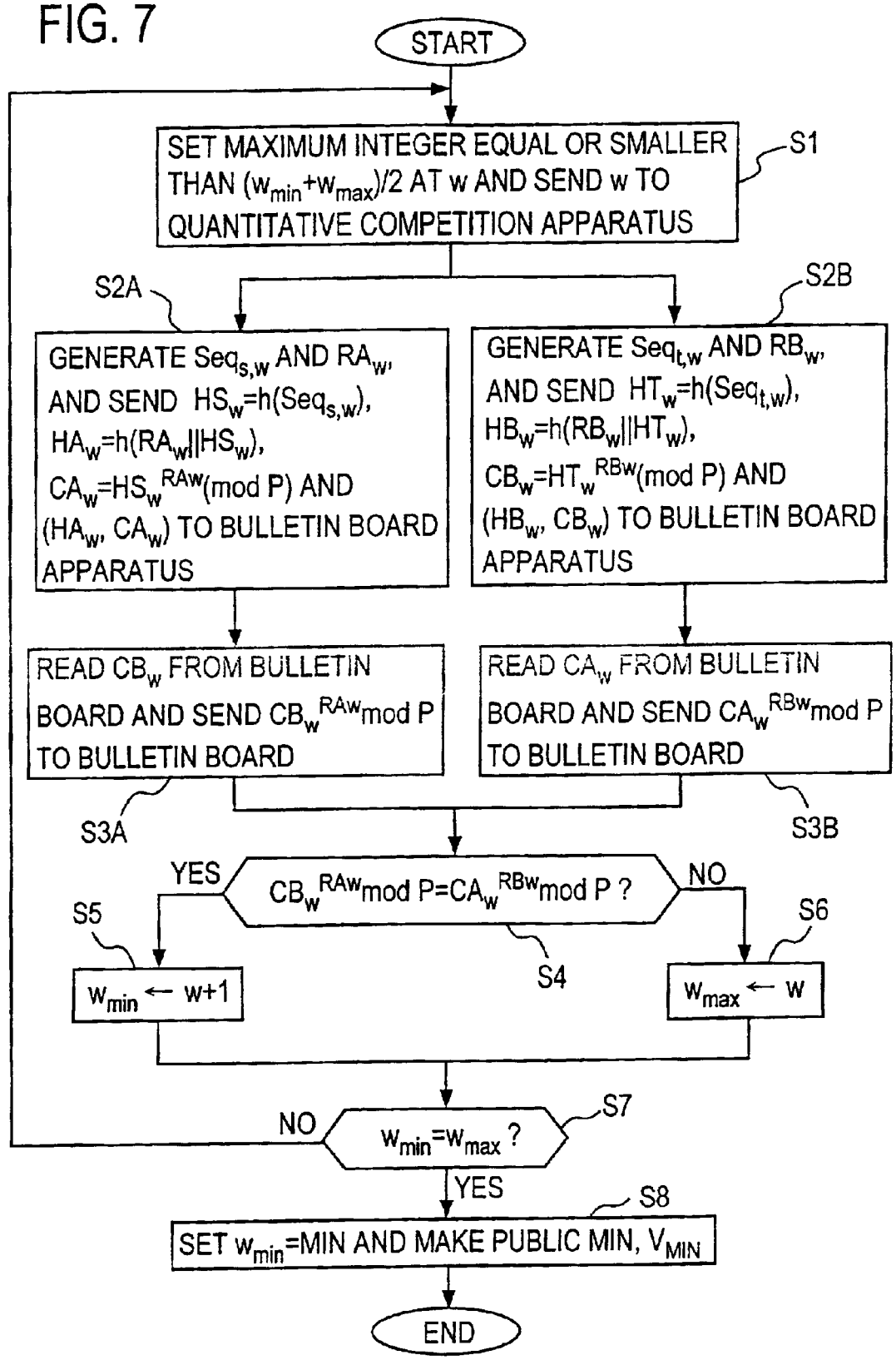

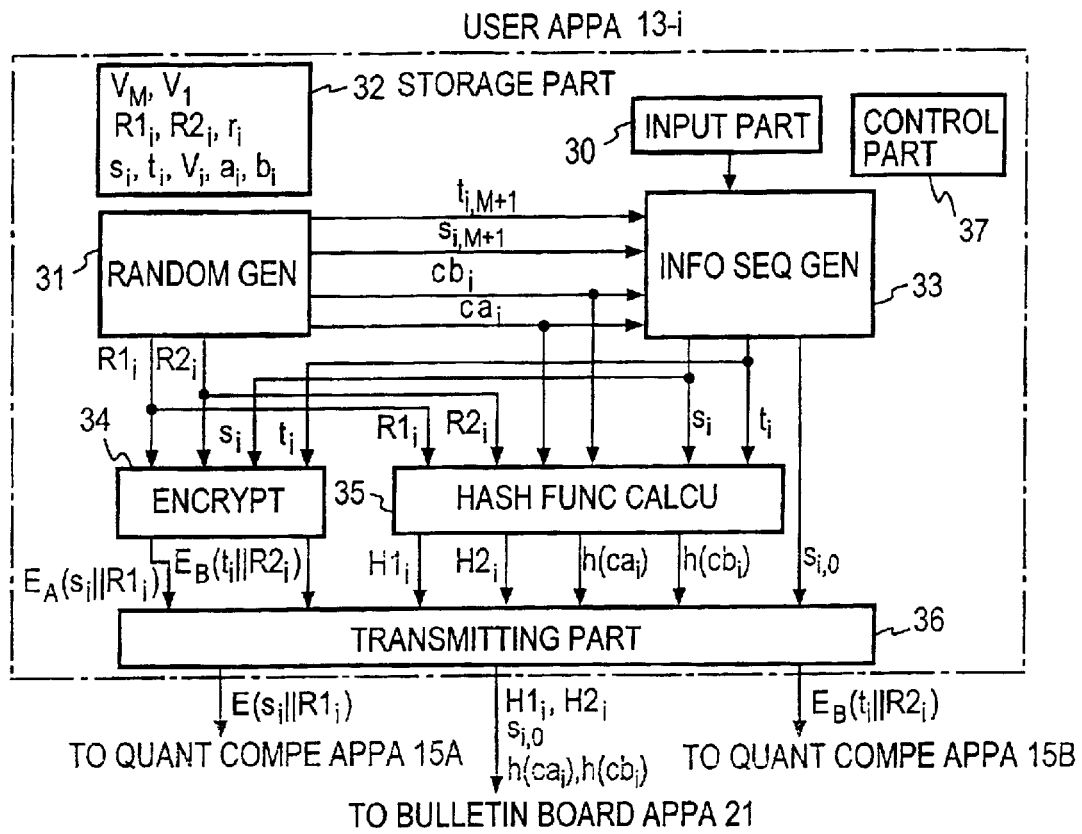

METHOD, APPARATUS AND PROGRAM FOR QUANTITATIVE COMPETITION AND RECORDING MEDIUM HAVING RECORDED THEREON THE PROGRAM

BACKGROUND OF THE INVENTION

The present invention relates to a method and apparatus for quantitative competition that compare users' aimed or intended values online, for example, across the Internet while holding them in secrecy and specify the maximum or minimum one of the intended values and only the user having committed it as his intended value.

An example of the online quantitative competition is an "electronic sealed-bit auction scheme." With this scheme, the maximum or minimum value and the user having committed it as his intended value are specified, and techniques for holding other information in secret. This scheme is disclosed, for example, in Kobayashi and Morita, "Efficient sealed-bid auction with quantitative competition using one-way functions," ISEC99. Further, in H. Kikuchi, M. Harkavy and J. D. Tygar, "Multi-round anonymous auction protocols," IEEE Workshop on Dependable and Real-Time E-Commerce System, 1998, there is proposed a scheme that decides whether there is a user having committed his intended value equal to or greater than or smaller than a certain numerical value. The latter scheme has a disadvantage that when plural users have committed the maximum or minimum value as their intended values, those users cannot be specified and that they can detect a second highest or lowest numerical value.

SUMMARY OF THE INVENTION

It is therefore an object of the present invention to provide a method and apparatus that compare plural users' intended values online, specify the maximum or minimum one of the users' intended values with high security and efficiently and, if necessary, the user of the intended value corresponding to the specified value but keep the other users secret.

For M integral values to be compared, their upper- and lower-limit values $V_M$ and $V_1$ are determined in advance. In this case, $V_k > V_{k-1}$, where $k=2, 3, \ldots, M$. Incidentally, since the maximum and minimum values are specified by substantially the same method, the following description will be given only of the case of specifying the minimum value.

After determining his intended value $V_{vi}$ equal to or greater than $V_1$ and equal to or smaller than $V_M$, each user 11-$i$ (where $i=1, 2, \ldots, M$) generates in a user apparatus two M-element sequences of information $s_i$ and $t_i$ such that their elements corresponding to values equal to or greater than $V_1$ and equal to or smaller than $V_{vi}$ are equal but other elements differ, and secretly sends the sequence of information $s_i$ to a first quantitative competition apparatus and the sequence of information $t_i$ to a second quantitative competition apparatus. With the sequence of information $s_i$ or $t_i$ alone, it is impossible to obtain information about the value $V_{vi}$, and hence there is no possibility of the value $V_{vi}$ being available to any body and even to each quantitative competition apparatus.

After the sequences of information $s_i$ and $t_i$ (where $i=1, 2, \ldots, N$) about all users' intended values are obtained, the minimum value is determined. It can be determined by any desired procedure. An efficient scheme will be described below. For example, in the first place, initial values of two variables $w_{min}$ and $w_{max}$ are set at 1 and M, respectively, the maximum integer equal to or greater than $(w_{min}+w_{max})/2 = (1+M)/2$ is set at w, and a check is made to see if there is a user whose intended value is equal to or smaller than $V_w$. To perform this, the first quantitative competition apparatus extracts w-th elements $s_{i,w}$ from all users' sequences of information $s_i$, and generates $Seq_{s,w}=s_{1,w}\|s_{2,w}\| \ldots \|s_{N,w}$ (where $\|$ indicates the concatenation of data) in which the extracted elements are arranged in a predetermined order (for example, in the order of numbers pre-assigned to the users). The second quantitative competition apparatus extracts w-th elements $t_{i,w}$ from all users' sequences of information $t_i$, and generates $Seq_{t,w}=t_{1,w}\|t_{2,w}\| \ldots \|t_{N,w}$ in which the extracted elements are arranged in a predetermined order. Then, $Seq_{s,w}$ and $Seq_{t,w}$ are compared whether they are equal or not using one-way functions or encryption functions without revealing their values. If they differ from each other, it is decided that there is a user whose intended value is equal to or smaller than $V_w$, then w is substituted for the variable $w_{max}$, then $Seq_{s,w}$ and $Seq_{t,w}$ are similarly generated, and they are compared. If they are equal to each other, it is decided that there is no user whose intended value is equal to or smaller than $V_w$, then w+1 is substituted for the variable $w_{min}$, and the above manipulation is repeated until $w_{min}=w_{max}(=MIN)$, by which the minimum value $V_{MIN}$ is determined.

When $w_{min}=w_{max}=MIN$ is reached, $Seq_{s,MIN}$ and $Seq_{t,MIN}$ are made public so that every body can specify the user whose intended value is the minimum value $V_{MIN}$.

BRIEF DESCRIPTION OF THE DRAWINGS

FIG. 4 is a block diagram showing examples of main functional configurations of a quantitative competition apparatus 15A;

FIG. 7 is a flowchart showing the procedure for specifying the minimum value;

FIG. 8 is a block diagram depicting the functional configuration of a user apparatus in a second embodiment of the present invention;

FIG. 9 is a block diagram depicting the functional configuration of an information sequence generating part 33 in FIG. 8.

DETAILED DESCRIPTION OF THE PREFERRED EMBODIMENTS

Assume that the upper- and lower-limit integral values $V_M$ and $V_1$ and a large prime P are already determined prior to quantitative competition. The prime number P is one that P−1 has a large prime factor as a divisor, that is, a prime that is used for a cryptosystem based on a discrete logarithm problem.

A description will be given of a first embodiment directed to a method with which it is possible to specify the lowest one of all bidders' intended values and the lowest bidder through use of two quantitative competition apparatuses, followed by a second embodiment that provides increased security in the above-mentioned quantitative competition method, and by a third embodiment that employs three quantitative competition apparatuses to ensure specifying the lowest one of all bidders' intended values and the lowest bidder even if one of the quantitative competition apparatuses goes down during operation.

First Embodiment

Figure 1:
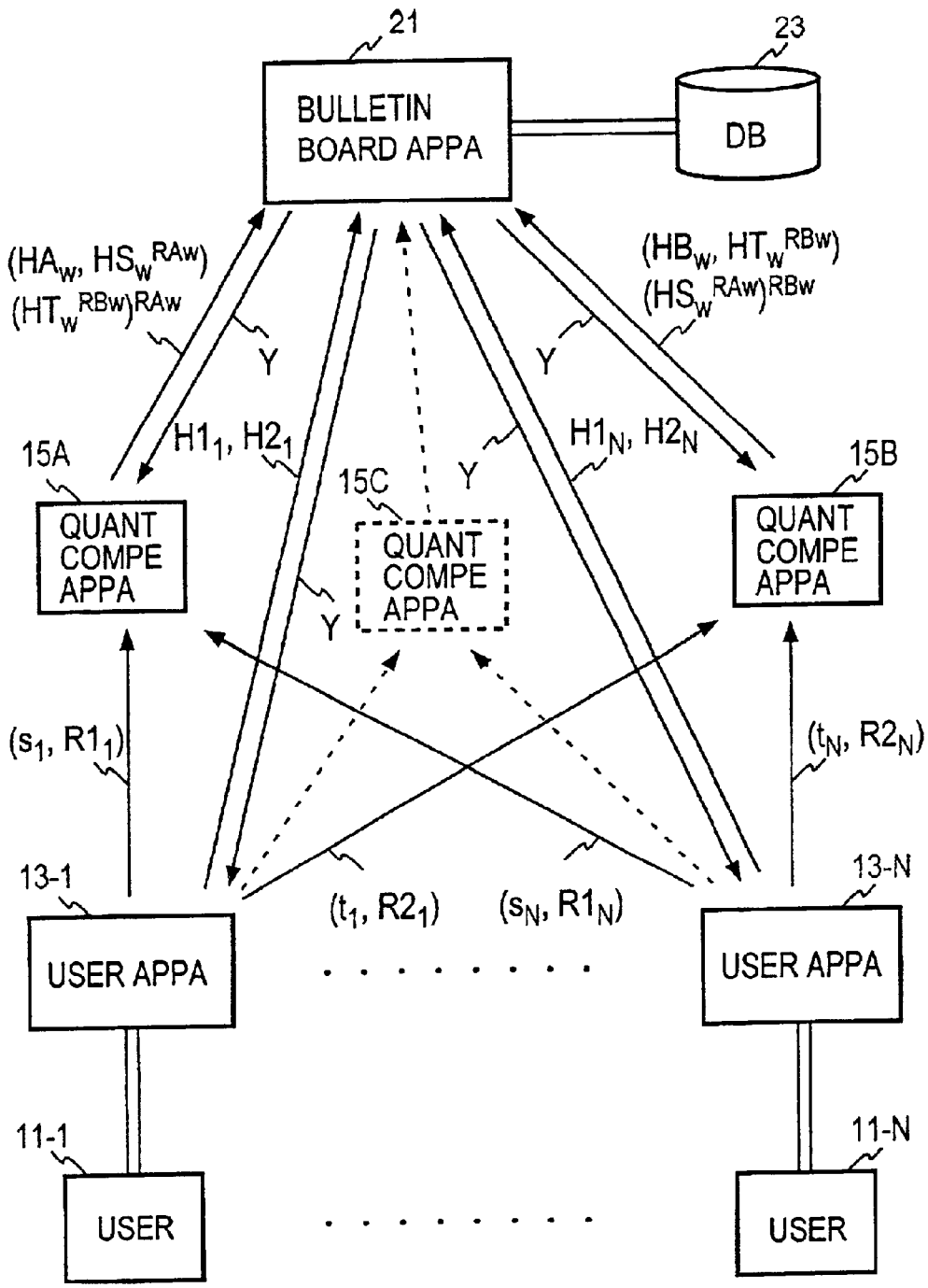
FIG. 1 is a diagram schematically illustrating an example of the entire system configuration of a first embodiment of the present invention.

FIG. 1 illustrates in block form the entire system configuration of a first embodiment of the present invention, which comprises user apparatuses 13-1 to 13-N, quantitative competition apparatuses 15A and 15B, a bulletin board apparatus 21 and a database 23. The user apparatuses 13-1 to 13-N are each capable of communicating with the quantitative competition apparatuses 15A, 15B and the bulletin board apparatus 21 through a communication network, and the quantitative competition apparatuses 15A and 15B are capable of communicating with the bulletin board apparatus 21. Reference character Y indicates information read out of the bulletin board apparatus 21, to which the database 23 is connected. A quantitative competition apparatus 15C surrounded by the broken line is used in a third embodiment described later on.

Figure 2:
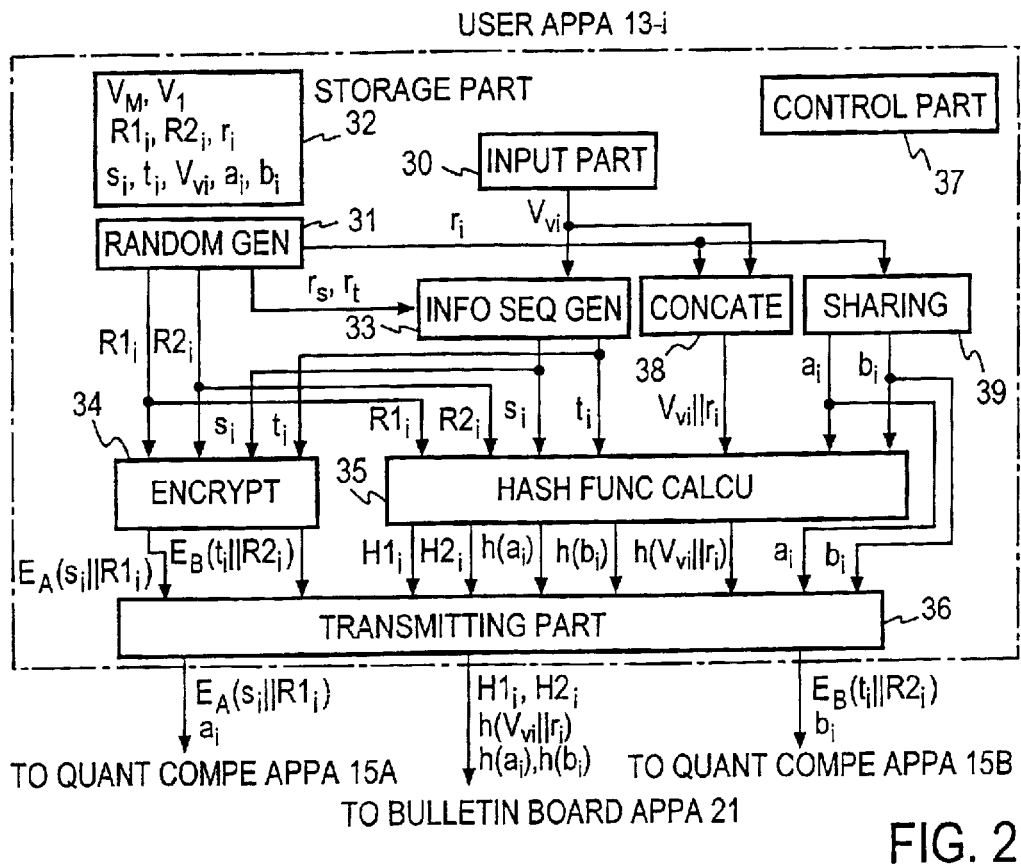
FIG. 2 is a block diagram showing examples of main functional configurations of a user apparatus.

Each user apparatus 13-$i$ comprises, as depicted in FIG. 2, an input part 30, a random generating part 31, a storage part 32, an information sequence generating part 33, an encrypting part 34, a hash function calculating part 35, a transmitting part 36, a control part 37, a concatenating part 38, and a sharing part 39.

Each user 11-$i$ (where i=1, 2, ..., N) determines or chooses his or her aimed or intended integral value $V_{vi}$ in the range from $V_1$ to $V_M$, and inputs the integral value to the user apparatus 13-$i$ via the input part 30 such as a keyboard. The information sequence generating part 33 generates two sequences of information of the same number M of elements, $s_i=\{s_{i,1}, \ldots s_{i,2}, \ldots, s_{i,M}\}$ and $t_i=\{t_{i,1}, t_{i,2}, \ldots, t_{i,M}\}$ based on the input information $V_{vi}$ and a random number generated by the random generating part 31. The number M is indicative of the value that the each user is allowed to choose as the intended value from among $V_1$ to $V_M$; accordingly, a series of monotone increasing values $V_1$ to $V_M$ have a one-to-one correspondence with the numbers 1 to M.

On choosing the intended value $V_{vi}$, the user 11-$i$ generates the two sequences of information $s_i$ and $t_i$ so that $s_{i,1}=t_{i,1}$, $s_{i,2}=t_{i,2}$, ..., $s_{i,vi-1}=t_{i,vi-1}$, $s_{i,vi} \neq t_{i,vi}$, $s_{i,v+1} \neq t_{i,v+1}$, ..., $s_{i,M} \neq t_{i,M}$. That is, $s_i$ and $t_i$ are generated so that the corresponding elements (information) in the range of from $V_1$ to $V_{vi}$ are equal but that the corresponding elements in the range of from $V_{vi}$ to $V_M$ differ from each other.

Figure 3:
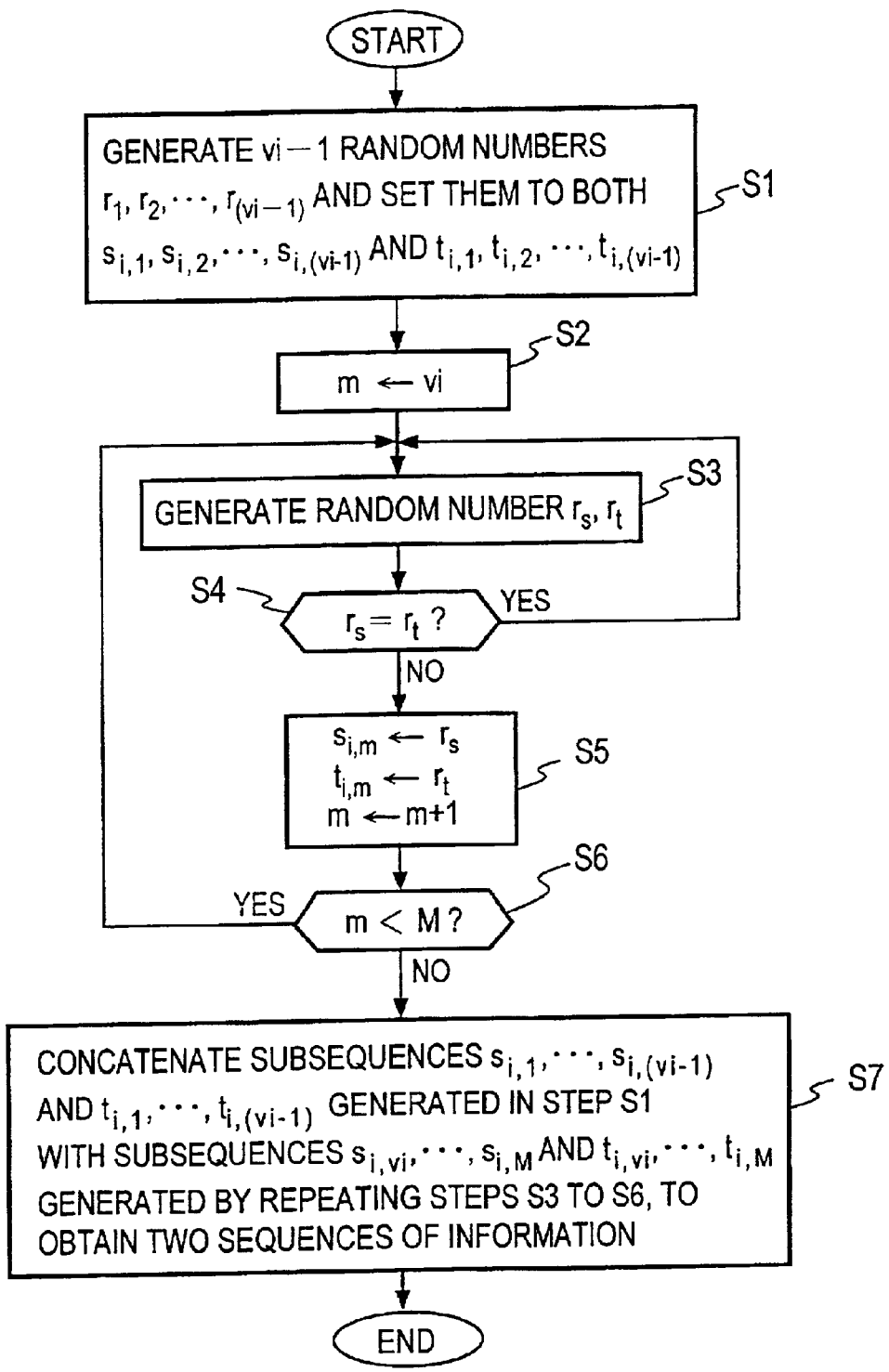
FIG. 3 is a flowchart showing the procedure for generating two sequences of information.

FIG. 3 is a flowchart showing the procedure for generating such two sequences of information $s_i$ and $t_i$.

Step S1: Generate vi-1 random numbers $r_1, r_2, \ldots, r_{(vi-1)}$ each consisting of a predetermined number of bits, and divides these random numbers into two subsequences $s_{i,1}, s_{i,2}, \ldots, s_{i,vi-1}$ and $t_{i,1}, t_{i,2}, \ldots, t_{i,vi-1}$ where $s_{i,m}=t_{i,m}$, m=1, 2, ..., vi-1.

Step S2: Let m be vi.

Step S3: Generate two random numbers $r_s$ and $r_t$.

Step S4: Compare the two random numbers, and if they are equal, then return to step S3.

Step S5: If the two random numbers differ from each other, set $r_s$ at $s_{i,m}$ and $r_t$ at $t_{i,m}$ and increment m by one.

Step S6: If m is smaller than M, then return of step S3.

Step S7: If m is not smaller than M in step S6, then concatenate the above-mentioned two subsequences $s_{i,1}, s_{i,2}, \ldots, s_{i,vi-1}$ and $t_{i,1}, t_{i,2}, \ldots, t_{i,vi-1}$ with $s_{i,vi}, s_{i,vi+1}, \ldots, s_{i,M}$ and $t_{i,vi}, t_{i,vi+1}, \ldots, t_{i,M}$ set by repeating steps S3 to S5, thereby obtaining two sequences of information $s_i=\{s_{i,1}, s_{i,2}, \ldots, s_{i,M}\}$ and $t_i=\{t_{i,1}, t_{i,2}, \ldots, t_{i,M}\}$. The two sequences of information thus obtained are stored in the storage part 32 in FIG. 2.

The random generating part 31 generates random numbers $R1_i$ and $R2_i$, and pairs of information ($s_i$, $R1_i$) and ($t_i$, $R2_i$) are sent secretly to the quantitative competition apparatuses 15A and 15B, respectively; for example, the pairs of information are encrypted with encryption functions $E_A$ and $E_B$ in the encrypting part 34 into encrypted sequences of information $E_A(s_i\|R1_i)$ and $E_B(t_i\|R2_i)$ for transmission to the quantitative competition apparatuses 15A and 15B. The encryption functions $E_A$ and $E_B$ are public-key cryptofunctions that only the quantitative competition apparatuses 15A and 15B can decrypt, respectively. Further, the random generator 31 generates a random number $r_i$ as data that is used to verify the fairness of the minimum intended value $V_{MIN}$ described later on, and the concatenating part 38 generates $V_{vi}\|r_i$ that is a concatenation of the intended value $V_{vi}$ and the random number $r_i$; furthermore, the sharing part 39 determines random information $a_i$ and $b_i$ such that $r_i=a_i*b_i$ (where * is an operator made public in advance). The operator * may be any operators that uniquely define the random number $r_i$ when the pieces of random information $a_i$ and $b_i$ are given, such as exclusive OR, subtraction, addition and so forth.

The hash function calculating part 35 calculates, by a hash function h, hash values $H1_i=h(s_i\|R1_i)$ and $H2_i=h(t_i\|R2_i)$ for concatenations of the respective sequences of information and the random numbers, $s_i\|R1_i$ and $t_i\|R2_i$. The hash function calculating part 35 further calculates hash values $h(a_i)$, $h(b_i)$ and $h(V_{vi}\|r_i)$ of $a_i$, $b_i$ and $V_{vi}\|r_i$, and sends all of these values to the bulletin board apparatus 21. Incidentally, the minimum and maximum values $V_1$ and $V_M$, the two sequences of information $s_i$ and $t_i$, the random numbers $R1_i$ and $R2_i$, the intended value $V_{vi}$, the random number $r_i$ and the random information $a_i$ and $b_i$ are stored in the storage part 32, from which they are sent by the transmitting part 36 to the quantitative competition apparatuses 15A, 15B and the bulletin board apparatus 21. The control part 37 controls reading from or writing to the storage part 32 and operations of the respective parts. The user apparatus 13-$i$ may also be configured to execute programs by a computer.

Each user apparatus 13-$i$ commits the intended value $V_{vi}$ by sending the hash values $h(V_{vi}\|r_i)$, $H1_i$ and $H2_i$ to the bulletin board apparatus 21 for publication as mentioned above. This means that each user registers $V_{vi}$ as his intended value without making it public. As a result, the intended value $V_{vi}$ is made unchangeable thereafter, and when a value equal to or larger than the intended value $V_{vi}$ is made public as the minimum value $V_{MIN}$ in the bulletin board apparatus 21 for some reason, each user apparatus makes public the pairs of information ($s_i$, $R1_i$) and ($t_i$, $R2_i$), or ($V_{vi}\|r_i$) to indicate that the intended value $V_{vi}$ is equal to or smaller than the minimum value $V_{MIN}$, thereby verifying that the published minimum value $V_{MIN}$ is cheating. It is for the reasons given below not to singly hash the information sequences $s_i$ and $t_i$ to be sent to the bulletin board apparatus 21 but instead to hash their concatenations with the random numbers $R1_i$ and $R2_i$. That is, letting $H1_i=h(s_i)$ and $H2_i=h(t_i)$, if the number of bits of each element of the information sequences $s_i$ and $t_i$ are decreased for the purpose of reducing channel capacity and another user learns either one of the sequences of information $s_i$ and $t_i$ by some means, then the user could easily estimate the other information sequence (the knowledge of $s_i$ and $t_i$ may enable the user to know the value $V_{v,i}$); therefore, the above scheme is intended to prevent such leakage of the information sequences and hence provide increased security for the quantitative competition apparatuses 15A and 15B. In practice, however, the security may be diminished to some extent, and if the number of bits of each element is large, the random numbers $R1_i$ and $R2_i$ may be omitted.

The quantitative competition apparatuses 15A (and 15B) comprise, as shown in FIG. 4 (and FIG. 5), receiving parts 40A (40B), decrypting parts 37A (47B), storage parts 41A (41B), random generating parts 42A (42B), hash function calculating parts 43A (43B), modular exponentiation parts 44A (44B), transmitting parts 45A (45B), and control parts 46A (46B).

In the quantitative competition apparatus 15A the encrypted sequence of information $E_A(s_i\|R1_i)$ received in the receiving part 40A is decrypted in the decrypting part 47A into $s_i\|R1_i$ (where i=1, ..., N), and if necessary, the decrypted information $s_i\|R1_i$ is hashed in the hash function calculating part 43A to obtain a hash value $h(s_i\|R1_i)$; it is possible to verify that the hash value matches the value $H1_i$ made public in the bulletin board apparatus 21. The sequences of information $s_1$ to $s_N$ and the random numbers $R1_1$ to $R1_n$ are separated from the value $s_i\|R1_i$ and are stored in the storage part 41A. In the storage part 41A there is also prestored the afore-mentioned large prime P.

The bulletin board apparatus 21 stores information received from the user apparatuses 13-1 to 13-N and the quantitative competition apparatuses 15A and 15B in the data base 23, which is accessible from any apparatuses. In the quantitative competition processing the bulletin board apparatus 21 decides whether the pieces of information sent from the quantitative competition apparatuses 15A and 15B match each other, and based on the result of decision, updates the value w to be provided to the quantitative competition apparatuses 15A and 15B. Since the bulletin board apparatus 21 performs only such functions, their functional configurations are not shown.

Upon completion of transmission of the encrypted sequences of information $E_A(s_i\|R1_i)$ and $E_B(s_i\|R1_i)$ and the hash values $H1_i$, $H2_i$, $h(V_{v,i}\|r_i)$, $h(a_i)$ and $h(b_i)$ from every user 13-$i$ (where i=1, ..., N), for example, the bulletin board apparatus 21 sends to the quantitative competition apparatuses 15A and 15B an initial value $V_w$ that is the maximum integer equal to or larger than $(w_{min}+w_{max})/2=(1+M)/2$ where $w_{min}$ and $w_{max}$ are two integral variables and have their initial values set at 1 to M, respectively, the initial value $V_w$ being received in the receiving parts 40A and 40B. The quantitative competition apparatus 15A generates, as depicted in FIG. 4, a random number $RA_w$ in the random generating part 42A, then reads out of the storage part 41A those elements $s_{i,w}$ in the sequences of information $s_i$ received from all the user apparatuses 13 which correspond to the value w, and generates, by a sequence generator 48A, $Seq_{s,w}=s_{1,w}\|s_{2,w}\| \ldots \|s_{N,w}$, which is a concatenation of the read-out elements arranged in the order of the users 11-1, 11-2, ..., 11-N. The hash function calculating part 43A calculates a hash value $HS_w=h'(Seq_{s,w})$ for the element concatenation $Seq_{s,w}$ by a hash function h' and a hash value $HA_w=h(RA_w\|HS_w)$, by a hash function h, for a concatenation $RA_w\|HS_w$ of the random number $RA_w$ and the hash value $HS_w$ produced by a concatenator 49A. The hash value $HS_w$ and the random number $RA_w$ are input to the modular exponentiation part 44A for calculating $CA_w=HS_w^{RAw}(\bmod P)$, and a pair $(HA_w, CA_w)$ is sent from the transmitting part 45A to the bulletin board apparatus 21, wherein it is made public. The hash function h' is a one-way function that maps a given value over a finite field uniquely and randomly. The hash function h is a general-purpose function like SHA-1.

Figure 5:
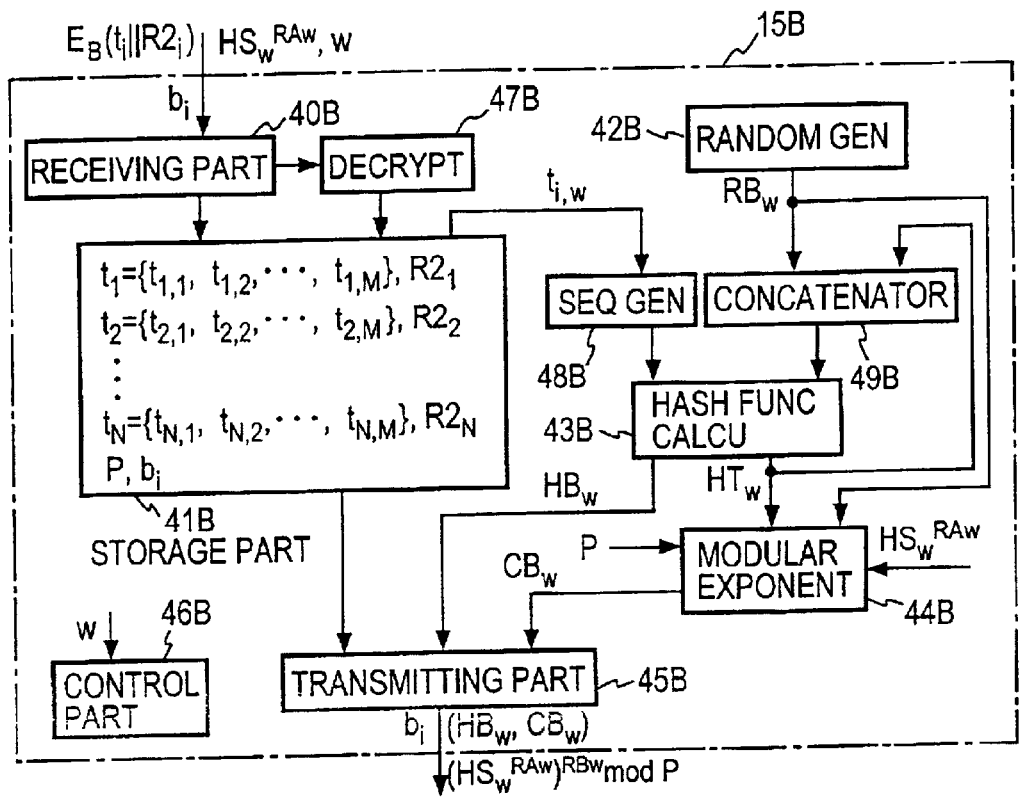
FIG. 5 is a block diagram showing examples of main functional configurations of a quantitative competition apparatus 15B.

The quantitative competition apparatus 15B generates, as depicted in FIG. 5, a random number $RB_w$ in the random generating part 42B, then reads out of the storage part 41B those elements $t_{i,w}$ in the sequences of information $t_i$ received from all the user apparatuses 13 which correspond to the value w, and generates, by a sequence generator 48B, $Seq_{t,w}=t_{1,w}\|t_{2,w}\| \ldots \|t_{N,w}$, which is a concatenation of the read-out elements arranged in the order of the users 11-1, 11-2, ..., 11N. The hash function calculating part 43B calculates a hash value $HT_w=h'(Seq_{t,w})$ for the element concatenation $Seq_{t,w}$ by a hash function h' and a hash value $HB_w=h(RB_w\|HT_w)$, by a hash function h, for a concatenation $RB_w\|HT_w$ of the random number $RB_w$ and the hash value $HT_w$ produced by a concatenator 49B. The hash value $HT_w$ and the random number $RB_w$ are input to the modular exponentiation part 44B for calculating $CB_w=HT_w^{RBw}(\bmod P)$, and a pair of values $(HB_w, CB_w)$ is sent from the transmitting part 45B to the bulletin board apparatus 21, wherein it is made public.

Next, the quantitative competition apparatus 15A reads the information $CB_w$ made public by the bulletin board apparatus 21, then inputs it to the modular exponentiation part 44A, then calculates $CB_w^{RAw}$ by the random number $RA_w$, and sends the calculation result to the bulletin board apparatus 21. Similarly, the quantitative competition apparatus 15B also reads $CA_w=HS_w^{RAw}(\bmod P)$ made public by the bulletin board apparatus 21, then inputs it to the modular exponentiation part 44B to calculate $CA_w^{RBw}=(HS_w^{RAw})^{RBw}(\bmod P)$, and sends the result of calculation to the bulletin board apparatus 21.

Figure 6:
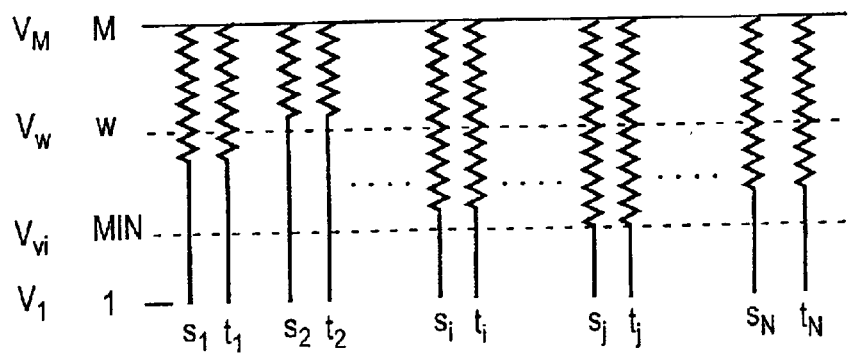
FIG. 6 is a diagram schematically depicting two sequences of information of respective pairs.

FIG. 6 schematically shows in vertical form the sequences of information $s_i$ and $t_i$ (where i=1, ..., N) that each user apparatus 13-$i$ generates in the information sequence generating part 33. In a given pair $(s_{i,m}, t_{i,m})$ of the corresponding elements in each pair of sequences of information $s_i=\{s_{i,1}, s_{i,2}, \ldots, s_{i,m}, \ldots, s_{i,M}\}$ and $t_i=\{t_{i,1}, t_{i,2}, \ldots, t_{i,m}, \ldots, t_{i,M}\}$, the straight-line portions represent subsequences where $s_{i,m}=t_{i,m}$, and the zigzag portions represent subsequences where $s_{i,m}\neq t_{i,m}$. For example, when the value m=w passes through the straight-line portions of all pairs of sequences of information $s_i$ and $t_i$ as shown, $(s_{i,w}\|s_{2,w}\| \ldots \|s_{N,w})=(t_{i,w}\|t_{2,w}\| \ldots \|t_{N,w})$, that is, $Seq_{s,w}=Seq_{t,w}$, and consequently, it can be seen that $h'(Seq_{s,w})=h'(Seq_{t,w})$, that is, $HS_w=HT_w$. However, if the value w is high enough to pass through the zigzag portions of at least one pair of sequences of information $s_i$ and $t_i$, the likelihood of $HS_w=HT_w$ is negligibly little since $(s_{i,w}\|s_{2,w}\| \ldots \|s_{N,w})\neq(t_{i,w}\|t_{2,w}\| \ldots \|t_{N,w})$. Accordingly, $HS_w\neq HT_w$.

When $HS_w=HT_w$, the values $(HT_w^{RBw})^{RAw}(\bmod P)$ and $(HS_w^{RAw})^{RBw}(\bmod P)$ sent to the bulletin board apparatus 21 are equal to each other. Since P is a large prime and since P−1 has a large prime factor as its divisor, the likelihood of the values $(HT_w^{RBw})^{RAw}(\bmod P)$ and $(HS_w^{RAw})^{RBw}(\bmod P)$ being equal is negligibly little when $HS_w\neq HT_w$. Accordingly, when $(HT_w^{RBw})^{RAw}(\bmod P)=(HS_w^{RAw})^{RBw}(\bmod P)$, since $s_{1,w}=t_{1,w}, s_{2,w}=t_{2,w}, \ldots, s_{N,w}=t_{N,w}$, it holds that $s_{i,m}=t_{i,m}$ (where m=1, ..., w) for each i and the intended value $V_{v,i}$ is not included in first to w-th values $V_1$ to $V_w$ among M values $V_1$ to $V_M$; therefore, the minimum intended value $V_{MIN}$ is not included. In other words, the minimum intended value is present in the range of (w+1)-th to M-th values. It can be seen that when $(HT_w^{RBw})^{RAw}(\bmod P)\neq (HS_w^{RAw})^{RBw}(\bmod P)$, the probability of the minimum intended value being present in the w-th and subsequent values is overwhelmingly high.

The bulletin board apparatus 21 makes the above comparison, then substitutes w+1 for the variable $w_{min}$ or w for the variable $w_{max}$ depending on whether $(HT_w^{RBw})^{RAw}$ (mod P) and $(HS_w^{RAw})^{RBw}$ (mod P) are equal or not, and repeats the above manipulation. After approximately log M rounds of manipulation, $w_{max}=w_{min}$ (=MIN). In this instance, the MIN-th value $V_{MIN}$ in the range from $V_1$ to $V_M$ is the minimum intended value.

FIG. 7 shows the procedure of searching for the minimum value described above.

Step S1: The bulletin board apparatus 21 initializes the variables $w_{min}$ and $w_{max}$ at 1 and M, respectively, then calculates the maximum integer w equal to or smaller than $(w_{min}+w_{max})/2$, and sends the value w to the quantitative competition apparatuses 15A and 15B.

Step S2A: The quantitative competition apparatus 15A generates the element concatenation $Seq_{s,w}$ and the random number $RA_w$, then calculates the hash values $HS_w$=h'($Seq_{s,w}$) and $HA_w$=h($RA_w$||$HS_w$) and the modular exponent $CA_w = HS_w^{RAw}$(mod P), and sends ($HA_w$, $CA_w$) to the bulletin board apparatus 21.

Step S2B: Similarly, the quantitative competition apparatus 15B also generates the element concatenation $Seq_{t,w}$ and the random number $RB_w$, then calculates the hash values $HT_w$=h'($Seq_{t,w}$) and $HB_w$=h($RB_w$||$HT_w$) and the modular exponent $CB_w=HT_w^{RBw}$(mod P), and sends ($HB_w$, $CB_w$) to the bulletin board apparatus 21.

Step S3A: The quantitative competition apparatus 15A reads out $CB_w$ from the bulletin board apparatus 21, then calculates $CB_w^{RAw}$ mod P=$(HT_w^{RBw})^{RAw}$ mod P, and sends it to the bulletin board apparatus 21.

Step S3B: The quantitative competition apparatus 15B reads out $CA_w$ from the bulletin board apparatus 21, then calculates $CA_w^{RBw}$ mod P=$(HS_w^{RAw})^{RBw}$ mod P, and sends it to the bulletin board apparatus 21.

Step S4: The bulletin board apparatus 21 makes a check to determine if $(HT_w^{RBw})^{RAw}$ mod P and $(HS_w^{RAw})^{RBw}$ mod P match each other.

Step S5: If they match, the bulletin board apparatus 21 substitutes $w_{min}$ for $w_w$+1.

Step S6: If they do not match, the bulletin board apparatus 21 substitutes $w_{max}$ for $w_w$.

Step S7: A check is made to see if $w_{max}=w_{min}$, and if not, the procedure returns to step S1, followed by repeating steps S2A, S2B, S3A, S3B, S4, S5 and S6.

Step S8: If $w_{max}$ and $w_{min}$ are equal in step S7, then $w_{min}$=MIN and the value corresponding to the number MIN, as the minimum intended value $V_{min}$, are both made public. The quantitative competition apparatuses 15A and 15B send to the bulletin board apparatus 21 the element concatenations $Seq_{s,MIN}$ and $Seq_{t,MIN}$ corresponding to the number MIN, thereby making it possible to specify a user 11-j that the corresponding elements $s_{j,MIN}$ and $t_{j,MIN}$ in the two element concatenations differ from each other.

This means that the minimum intended value $V_{MIN}$ among the intended values $V_{v1}$ to $V_{vN}$ of the users 11-1 to 11-N has been obtained. After detecting the minimum intended value $V_{MIN}$ the quantitative competition apparatuses 15A and 15B send to the bulletin board apparatus 21 $Seq_{s,MIN}$, $RA_{MIN}$, $Seq_{t,MIN}$ and $RB_{MIN}$ obtained when $w_{min}=w_{max}$=MIN. As a result, all the users 11-1 to 11-N are allowed to compare the corresponding elements $s_{i,MIN}$ and $t_{i,MIN}$ of the two element concatenations $Seq_{s,MIN}$ and $Seq_{t,MIN}$ for each i=1, . . . , N and learn that the user 11-j corresponding to the j-th portion containing information $s_{j,MIN} \neq t_{j,MIN}$ has set the minimum intended value $V_{MIN}$ as his intended value $V_{vj}$. With the order of arrangement of $Seq_{s,MIN}$ and $Seq_{t,MIN}$ known, it is possible to specify the above-mentioned j-th user 11-j determined in step S8.

In this embodiment the quantitative competition apparatus 15A receives from the user 11-i (where i=1, . . . , N) the random information $a_i$ that is $r_i=a_i*b_i$, whereas the quantitative competition apparatus 15B receives the random information $b_i$ from the user 11-i. The bulletin board apparatus 21 receives h($a_i$), h($b_i$) and h($V_{vi}$||$r_i$) from each user 11-i. Accordingly, if the quantitative competition apparatus 15A happens to know the random number $r_i$ for every user prior to the search for the minimum intended value $V_{MIN}$, $V_w=V_{vi}$ that matches h($V_{vi}$||$r_i$) made public can be found out by calculating h($V_w$||$r_i$) sequentially from $V_1$ to $V_M$ for each i, and consequently, the quantitative competition apparatus 15B detects the minimum intended value $V_{MIN}$ before the bulletin board apparatus 21 begins to search for the vale $V_{MIN}$—this is undesirable from viewpoint of security. In the first embodiment, however, since the pieces of random information $a_i$ and $b_i$ that $r_i=a_i*b_i$ are provided separately to the quantitative competition apparatuses 15A and 15B, neither of them can singly search for the value $V_{MIN}$.

After the detection of the minimum intended value $V_{MIN}$ the validity of the value made public in the bulletin board apparatus 21 can be verified as described below.

The values h($a_j$), h($b_j$) and h($V_{vj}$||$r_j$) of the user 11-j are already made public. The quantitative competition apparatuses 15A and 15B respectively send the random information $a_j$ and $b_j$ to the bulletin board apparatus 21, in which they are made public. Each user apparatus 13-i uses the published values $V_{vj}=V_{MIN}$ to calculate h($V_{MIN}$||$a_j*b_j$) and verifies whether h($V_{MIN}$||$a_j*b_j$)=h($V_{vj}$||$r_j$). A mismatch means that the user 11-j, or the quantitative competition apparatus 15A or 15B has cheated. Then, the values h($a_j$) and h($b_j$) are calculated from $a_j$ and $b_j$, and a check is made to determine whether they match the published values. If a mismatch is found, it can be decided that the quantitative competition apparatus has cheated which sent that one of the pieces of random information $a_j$ and $b_j$ which does not match the corresponding value. If the both values match the published values, it can be decided that the user 11-j having sent the published value h($V_{vj}$||$r_j$) has cheated.

As described above, by determining the random information $a_i$ and $b_i$ such that $r_i=a_i*b_i$ and keeping h($a_i$), h($b_i$) and h($V_{vi}$||$r_i$) public in the bulletin board apparatus 21, each user can verify the validity of the random information $a_j$, $b_j$ sent from the quantitative competition apparatuses 15A and 15B to the bulletin board apparatus 21. This produces the same effect as is obtainable in the case where the user 11-i attaches his signature to the random information $a_i$, $b_i$ to guarantee their validity as long as it is proved that the verification information h($a_i$), h($b_i$) made public by the bulletin board apparatus 21 is about the user 11-i; furthermore, this scheme has advantages that the computational complexity involved is less than in the case of using the signature scheme and that the user does not require any signature means. Incidentally, it is desired in terms of security the random number $r_i$ be sufficiently large.

In the first embodiment, a person who knows $HT_w$ may estimate $HS_w$, and if it is correct, he can detect another user's intended value, but since P is a large prime and since P-1 has large prime factor as its divisor, it is difficult to calculate $RA_w$ of $HS_w^{RAw}$ mod P; hence, it is impossible to determine whether the estimated value $HS_w$ is truly correct. Accordingly, every user cannot find out any other user's intended value.

By making $RA_{MIN}$ and $RB_{MIN}$ public at last and using them and the element concatenations $Seq_{s,MIN}$ and $Seq_{t,MIN}$, it can be verified whether fair quantitative competitions have been made.

In the quantitative competition apparatuses 15A and 15B, reading from and writing to the storage parts 41A and 41B, processing of received information, transmission of various information via the transmitting parts 45A and 45B to respective apparatuses and the operations of the respective parts are laced under the control of the control parts 46A and 46B. The quantitative competition apparatuses 15A and 15B can also be functioned through executions of programs by a computer.

Though its functional configuration is not shown in particular, the bulletin board apparatus 21 is provided with a transmitting-receiving part for communication with each user apparatus and the quantitative competition apparatuses 15A and 15B, and stores received information in the database (FIG. 1). When requested, the bulletin board apparatus 21 reads out the requested information from the database 23 for transmission to the apparatus having made the request; furthermore, the apparatus 21 transmits and receives information necessary for the procedure of FIG. 7 and for its execution. The bulletin board apparatus 21 can also be functioned through execution of programs by a computer.

The first embodiment has been described above to determine the minimum value $V_{MIN}$ among all users' intended values $V_{vi}$ with the numbers 1 to M made to correspond with the values $V_1$ to $V_M$ in ascending order, but by making the numbers 1 to M correspond with the values $V_1$ to $V_M$ in descending order, the maximum value $V_{MAX}$ among all of the intended values $V_i$ can also be determined using the above-described algorithm intact. That is, letting vi represent the number corresponding to the intended value $V_{vi}$, the two sequences of information $s_i$ and $t_i$ need only to be generated so that, for the numbers 1 to M, $s_{i,w}=t_{i,w}$ or $s_{i,w}\ne t_{i,w}$ depending on whether the number element w is equal to or greater than 1 but smaller than vi or equal to or greater than vi but smaller than M. In short, only by arranging the values $V_1$ to $V_M$ upside down in FIG. 6, it can be seen that the determination of the number MIN which provides the minimum intended value $V_{MIN}$ is the same as the determination of the number MAX which provides the maximum intended value $V_{MAX}$. That is, in the first embodiment described above, if the order of numbering the values $V_1$ to $V_M$ is reversed to M to 1 and the number MIN is replaced with the number MAX, FIG. 7 will be the quantitative competition procedure of searching for the maximum intended value $V_{MAX}$. This applies to the embodiments described later on.

Second Embodiment

In the above-described first embodiment, if a certain user 11-$i$ conspires with either one of the two quantitative competition apparatuses, the user 11-$i$, though having committed the intended value $V_{vi}$, could secretly abandon the game (withdrawal of his bidding). The abandonment of the game mentioned herein means that the user 11-$i$ will not be determined to have committed the minimum $V_{MIN}$ (will not be a winning bidder) regardless of his committed intended value $V_{vi}$, that is, irrespective of whether the value $V_{vi}$ is the minimum among all the users' intended values $V_{v1}$, $V_{v2}, \ldots, V_{vN}$.

For example, in the case where the user 11-$i$ conspires with the quantitative competition apparatus 15B and, each time supplied with w from the bulletin board apparatus 21, embeds not the sequence element $t_{i,w}$ of the user 11-$i$ but the value of the sequence element $s_{i,w}$ from the user 11-$i$ in the element concatenation $Seq_{i,w}$ in step S2B of the FIG. 7 quantitative competition procedure to thereby alter the sequence $s_{i,w}\ne t_{i,w}$ to $s_{i,w}-t_{i,w}$, even if the intended value $V_{vi}$ of the user 11-$i$ is the minimum value $V_{MIN}$, the user 11-$i$ will not be determined to have committed the minimum value $V_{MIN}$ in the search for the minimum value by the bulletin board apparatus 21 but instead any one of the other users will be determined to have committed the minimum value $V_{MIN}$. Such a determination cannot be said to be fair. Since the afore-mentioned fairness verification scheme verifies $h(V_{vj}\|r_j)$ and $h(a_j\|b_j)$ only for the intended value $V_{vj}$ determined as the minimum value VMIN and published and the user 11-$j$, it is impossible to detect the cheat by a conspiracy between the user 11-$i$ and the quantitative competition apparatus 15B.

A description will be given below of a second embodiment adapted to prevent a cheat by such a conspiracy between a user and a quantitative competition apparatus.

The second embodiment features the method for generating the sequences of information $s_i$ and $t_i$ of each user 11-$i$ in the first embodiment. In this embodiment, an m-th element of each of the M-element sequences $s_i=\{s_{i,1}, \ldots, s_{i,M}\}$ and $t_i=\{t_{i,1}, \ldots, t_{i,M}\}$ is generated based on information about all elements preceding the m-th element. Accordingly, in the case of the sequence $s_{i,1}, \ldots, s_{i,M}$, if the m-th element $s_{i,m}$ is replaced with $t_{i,m}$ or some other value $s'_{i,m}$, the element $s'_{i,m}$ is not based on the information about the elements $s_{i,1}$, $s_{i,2}, \ldots, s'_{i,m}, \ldots, s_{i,M}$ preceding it, and the subsequent elements $s_{i,m+1}, \ldots, s_{i,M}$ are not based on the elements preceding the element $s_{i,m}$, either, and consequently, such a malicious replacement can be detected. The second embodiment will be described below concretely.

FIG. 8 illustrates in block form the configuration of the user apparatus 13-$i$ adapted for the quantitative competition according to the second embodiment. In this embodiment the concatenating part 38 and the sharing part 39 in the FIG. 2 configuration are removed and the information sequence generating part 33 has such a configuration as depicted in FIG. 9. The random generating part 31 generates, as in the FIG. 2 embodiment, the random numbers $R1_i$ and $R2_i$, and further generates initial random numbers $s_{i,M+1}$, $t_{i,M+1}$, $ca_i$ and $cb_i$. Based on these initial random numbers, the information sequence generating part 33 generates $s_{i,M}$, $s_{i,M-1}, \ldots, s_{i,1}, s_{i,0}$ and $t_{i,M}, t_{i,M-1}, \ldots, t_{i,1}$ in a sequential order.

FIG. 9 shows an example of the configuration of the information sequence generating part 33, which is shown to comprise hash calculators 33-1A and 33-1B, concatenators 33-2A and 33-2B, hash calculators 33-3A and 33-3B, and a concatenator 33-4. The hash calculators 33-1A and 33-1B are supplied with the initial random numbers $ca_i$ and $cb_i$, respectively, then calculate their hash values $h(ca_i)$ and $h(cb_i)$, and in the next and subsequent rounds of calculation repeats calculating hash values of the calculation results each time. The concatenator 33-2A concatenates the past sequence of information $s_i$ of the preceding rounds of calculation with the current outputs from the hash calculators 33-1A and 33-1B. The concatenator 33-2B concatenates the sequence of information $t_i$ of the preceding rounds of calculation with the current outputs from the hash calculators 33-1A and 33-1B. The hash calculators 33-3A and 33-3B calculate hash values of the outputs from the concatenators 33-2A and 33-2B, respectively, and output the hash values as the current sequence elements $s_{i,m}$ and $t_{i,m}$. The outputs from the hash calculators 33-1A and 33-1B, which are input to the concatenators 33-2A and 33-2B for an m-th round of hash calculation by the hash calculators 33-3A and 33-3B, are the outputs by an (m+1)-th round of hash calculation.

In the process for generating the subsequences $s_{i,m}$ and $t_{i,m}$ that are not equal, the initial random numbers $s_{i,M+1}$ and $t_{i,M+1}$ are input as initial values of the sequences of information $s_i$ and $t_i$ to the concatenators 33-2A and 33-2B, then the first-round outputs from the hash calculators 33-1A and 33-1B are input to the both concatenators 33-2A and 33-2B, and the hash values output from these concatenators are provided as sequences $s_i$ and $t_i$ of information of the second and subsequent rounds of calculation to the concatenators 33-2A and 33-2B. Upon completion of the generation of the subsequences from m=M to m=v, the output $s_{i,vi}\|t_{i,vi}$ from the concatenator 33-4 for m=vi−1 corresponding to the intended value $V_{vi}$ is input as the sequences of information $s_i$ and $t_i$ to the concatenators 33-2A and 33-2B, respectively, and the concatenated outputs are provided to the hash calculators 33-3A and 33-3B for calculating their hash values. In this process, since the same sequence of information $s_{i,vi}\|t_{i,vi}$ as the outputs from the hash calculators 33-1A and 33-1B are provided to the both concatenators 33-2A and 33-2B, the outputs $s_{i,m}$ and $t_{i,m}$ from the hash calculators 33-3A and 33-3B for m=vi−1 are equal to each other.

Thereafter, the outputs $s_{i,m}$ and $t_{i,m}$ from the hash calculators 33-3A and 33-3B are input again as sequences of information to the concatenators 33-2A and 33-2B, and hash calculations are repeated sequentially for m=vi−2, vi−3, ..., 0, by which the subsequence $s_{i,m}=t_{i,m}$ is generated.

Figure 10:
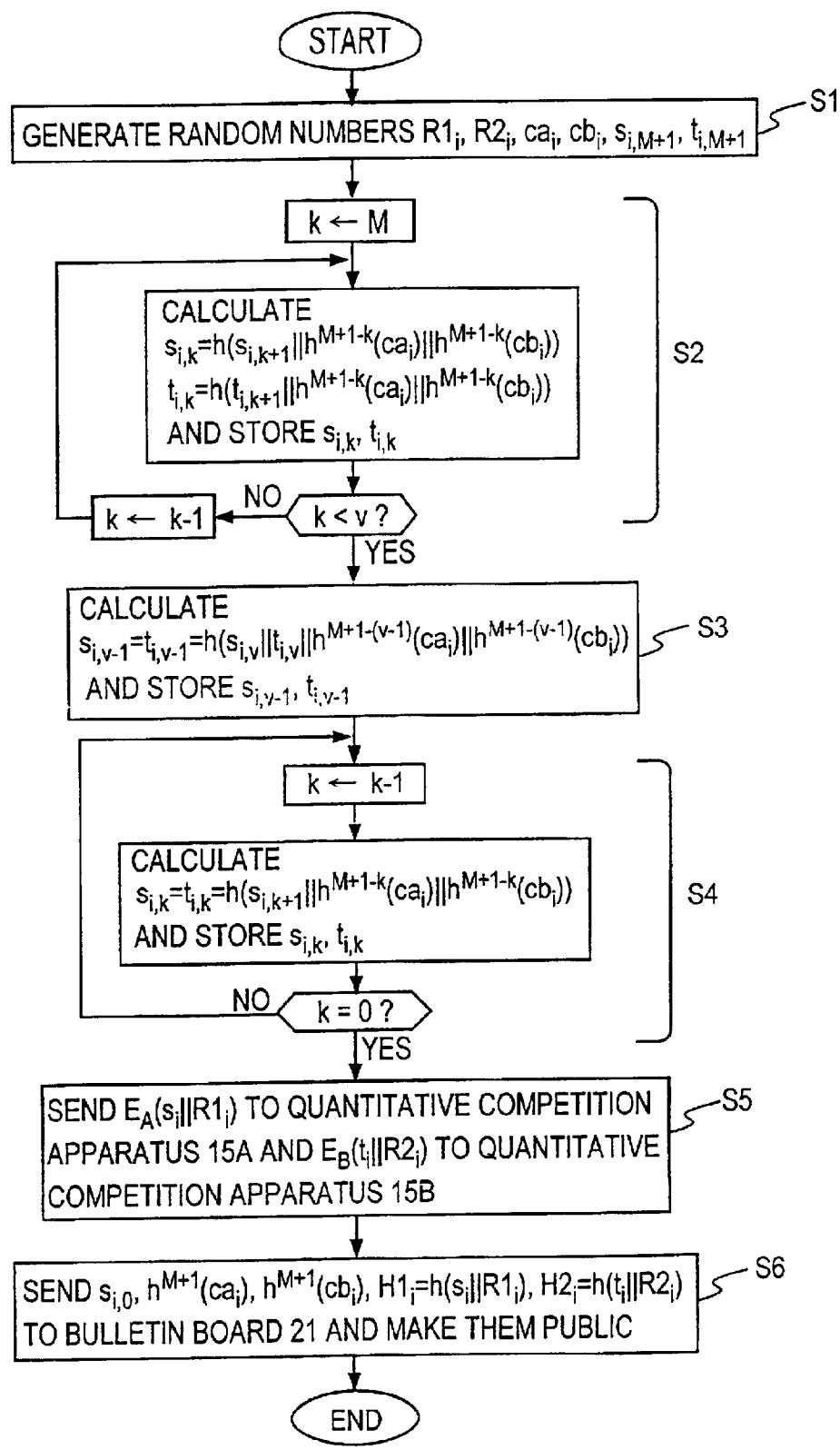
FIG. 10 is a flowchart showing the procedure that is followed by the user apparatus in the second embodiment.

FIG. 10 is a flowchart of the procedure to be followed by the user apparatus 13-$i$ in the second embodiment.

Step S1: Generate the initial random numbers $R1_i$, $R2_i$, $ca_i$, $cb_i$, $s_{i,M+1}$ and $t_{i,M+1}$.

Step S2: Set an initial value m at M, then sequentially calculate, for the element number vi corresponding to the intended value vi, $$s_{i,m}=h(s_{i,m+1}\|h^{M+1-m}(ca_i)\|h^{M+1-m}(cb_i))$$

$$t_{i,m}=h(t_{i,m+1}\|h^{M+1-m}(ca_i)\|h^{M+1-m}(cb_i))$$

for m=M, M−1, ..., vi, and store the calculation results as subsequences $s_{i,m} \neq t_{i,m}$.

Step S3: Calculate $$s_{i,m}=t_{i,m}=h(s_{i,m+1}\|t_{i,m+1}\|h^{M+1-m}(ca_i)\|h^{M+1-m}(cb_i))$$

for m=vi−1 and store it.

Step S4: Calculate $$s_{i,m}=t_{i,m}=h(s_{i,m+1}\|h^{M+1-m}(ca_i)\|h^{M+1-m}(cb_i))$$

sequentially for m=vi−2, vi−3, ..., 0 and store it as subsequences $s_{i,m}=t_{i,m}$.

Step S5: Encrypt $R1_i$ and $s_i=\{s_{i,1}, s_{i,2}, \ldots, s_{i,M}\}$, then send the resulting $E_A(s_i\|R1_i)$ to the quantitative competition apparatus 15A, then encrypt $R2_i$ and $t_i=\{t_{i,1}, t_{i,2}, \ldots, t_{i,M}\}$, and send the resulting $E_B(t_i\|R1_i)$ to the quantitative competition apparatus 15B.

Step S6: Send $H1_i=h(s_i\|R1_i)$, $H2_i=h(t_i\|R2_i)$, $s_{i,0}$, $h^{M+1}(ca_i)$ and $h^{M+1}(cb_i)$ to the bulletin board apparatus 21 for publication.

The quantitative competition processing, that is, the processing of searching for the minimum intended value $V_{MIN}$, by the bulletin board apparatus 21 and the quantitative competition apparatuses 15A and 15B is the same as described previously with reference to FIG. 7.

After specifying the minimum value $V_{MIN}$, the bulletin board apparatus 21 calculates the hash values $h(ca_i)$ and $h(cb_i)$ from the user apparatus 13-$i$ (M+1−MIN) times to obtain $h^{M+1-MIN}(ca_i)$ and $h^{M+1-MIN}(cb_i)$ (where i=1, 2, ..., N), which are made public. The validity of these values is guaranteed by verifying whether the values obtained by further calculating them MIN times match the published information $h^{M+1}(ca_i)$ and $h^{M+1}(cb_i)$. Moreover, since $s_{i,MIN}$, $t_{i,MIN}$, $h^{M+1-MIN}(ca_i)$ and $h^{M+1-MIN}(cb_i)$ of each user are made public by a winner (successful bidder) specifying phase, any user can equally calculate $s_{i,0}$ by executing step S4 through utilization of the published information.

If the user 11-$i$ and the quantitative competition apparatus 15A or 15B conspire to replace $s_{i,w}$ and $t_{i,w}$ for $s_{i,MIN}$ and $t_{i,MIN}$ as described previously, a value different from $s_{i,0}$ is usually calculated. In other words, the replacement is detected. But this verification is inefficient on the order of MN that is the product of the choosable number M of intended values and the number N of users. However, since the primary object is to determine the winner and his intended value, this "fairness verification phase" of the loser is not essential, and in practice it needs only to be performed after completion of the protocol.

Third Embodiment

In the first and second embodiments two quantitative competition apparatuses and each user apparatus generates two sequences of information $s_i$ and $t_i$. This embodiment uses three quantitative competition apparatuses, including the third quantitative competition apparatus 15C surrounded by the broken line in FIG. 1. Each user generates three sequences of information $s_i$, $t_i$ and $u_i$ in the same manner as in the afore-described embodiments such that $s_{i,m}=t_{i,m}=u_{i,m}$ for m=1, 2, ..., vi−1 and $s_{i,m} \neq t_{i,m} \neq u_{i,m}$ for m=vi, vi+1, ..., M where vi corresponds to the intended value $V_{vi}$, and secretly sends each of them to one of the three quantitative competition apparatuses, and as is the case with the first embodiment, the quantitative competition processing is carried out by two quantitative competition apparatus and the bulletin board apparatus. In this instance, when one of the two quantitative competition apparatuses goes down, the third quantitative competition apparatus carries on the processing of the failing apparatus. This embodiment is identical in basic operation with the first embodiment, and hence it will be described with reference to the drawings showing the first embodiment.

The user 13-$i$ (where i=1, 2, ..., N) determines the intended integral value $V_{vi}$ equal to or greater than $V_1$ and equal to or smaller than $V_M$, and generates, by the information sequence generating part 33 in the user apparatus 13-$i$ of FIG. 2, three sequences of information $s_i$, $t_i$ and $u_i$ such that pieces of information corresponding to the values in the range from $V_1$ to $V_{vi-1}$ are all equal but pieces of information corresponding to the values in the range from $V_{vi}$ to $V_M$ are all different. Further, the user generates random numbers $R1_i$, $R2_i$, $R3_i$ and $r_i$ in the random generating part 31, and determines random information $a_i$, $b_i$ and $c_i$ such that $r_i=a_i*b_i*c_i$. A pair of information $(s_i, R1_i)$ and the information $a_i$, a pair of information $(t_i, R2_i)$ and the information $b_i$, and a pair of information $(u_i, R3_i)$ and the information $c_i$ are sent secretly (in encrypted form) to the quantitative competition apparatuses 15A, 15B and 15C, respectively. Moreover, hash values $H1_i=h(s_i\|R1_i)$, $H2_i=h(t_i\|R2_i)$ and $H3_i=h(u_i\|R3_i)$ of concatenations $s_i\|R1_i$, $t_i\|R2_i$ and $u_i\|R3_i$ of the respective pairs are calculated using the hash function h; hash values $h(a_i)$, $h(b_i)$ and $h(c_i)$ of the random information and a hash value $h(V_i\|r_i)$ of the intended value $V_{vi}$ and the random number $r_i$ are calculated; and hash values $h(a_i)$, $h(b_i)$ and $h(c_i)$ of the random information and a hash value $h(V_i\|r_i)$ of the intended value $V_{vi}$ and the random number $r_i$ are calculated. These hash values are sent to the bulletin board apparatus 21, wherein they are made public.

Each user 11-$i$ commits the value $V_{vi}$ by sending the hash values $H1_i$, $H2_i$, $H3_i$ and $h(V_i\|r_i)$ to the bulletin board apparatus 21 and making them public. As a result, the intended value is no longer changeable, and if a value larger than the intended value $V_{vi}$ is determined to be the minimum value for some reason, the user can prove, by making public at least two of three pairs of information ($s_i$, $R1_i$), ($t_i$, $R2_i$) and ($u_i$, $R3_i$), that his intended value is qualified as the minimum value. Assume that the random number $r_i$ can be calculated when two of three pairs of information are known.

Since the subsequent quantitative competition processing can be performed by the bulletin board apparatus 21 and two quantitative competition apparatuses as described previously with reference to the first embodiment, the FIG. 7 procedure is followed using two quantitative competition apparatuses, for example, 15A and 15B.

That is, the bulletin board apparatus 21 first sends the maximum integer w equal to or smaller than $(w_{min}+w_{max})/2=(1+M)/2$ as an initial value to the both quantitative competition apparatuses 15A and 15B. The quantitative competition apparatus 15A generates a random number $RA_w$, then extracts elements $s_{i,w}$ of the $s_i$-sequences of information received from all user apparatuses, and generates an element concatenation $Seq_{s,w}=s_{1,w}\|s_{2,w}\| \ldots \|s_{N,w}$ such that the extracted elements are arranged in the order of users 11-1, 11-2, . . . , 11-N. Further, the quantitative competition apparatus 15A calculates a hash value $HS_w=h'(Seq_{s,w})$ by the hash function h', a hash value $HA_w=h(RA_w\|HS_w)$ by the hash function h, and a modular exponent $CA_w=HS_w^{RA_w} \pmod P$, and sends a pair of information ($HA_w$, $CA_w$) to the bulletin board 21. The quantitative competition apparatus 15B generates a random number $RB_w$, then extracts elements $t_{i,w}$ of $t_i$-sequences of information received from all the user apparatuses, then generates an element concatenation $Seq_{t,w}=t_{1,w}\|t_{2,w}\|\ldots\|t_N$, such that the extracted elements are arranged in the order of users 11-1, 11-2, . . . , 11-N, then calculates a hash value $HT_w=h'(Seq_{t,w})$ by the hash function h', a hash value $HB_w=h(RB_w\|HT_w)$ by the hash function h, and a modular exponent $CB_w=HT_w^{RB_w} \pmod P$, and sends a pair of information ($HB_w$, $CB_w$) to the bulletin board 21.

Next, the quantitative competition apparatus 15A reads the modular exponent $CB_w=HT_w^{RB_w} \pmod P$ made public by the bulletin board apparatus 21, then calculates $CB_w^{RA_w} \bmod P=(HT_w^{RB_w})^{RA_w} \pmod P$, and sends it to the bulletin board apparatus 21. The quantitative competition apparatus 15B reads the modular exponent $CA_w=HS_w^{RA_w} \pmod P$ made public by the bulletin board apparatus 21, then calculates $CA_w^{RB_w} \bmod P=(HS_w^{RA_w})^{RA_w} \pmod P$, and sends it to the bulletin board apparatus 21.

If $HS_w$ and $HT_w$ are equal, then $(HT_w^{RB_w})^{RA_w} \pmod P$ and $(HS_w^{RA_w})^{RB_w} \pmod P$ are equal, and since P is a large prime and P−1 has a large prime factor as its divisor, there is little possibility that $HS_w$ and $HT_w$ differ and $(HT_w^{RB_w})^{RA_w} \pmod P$ and $(HS_w^{RA_w})^{RB_w} \pmod P$ become equal. Accordingly, it can be seen that when $(HT_w^{RB_w})^{RA_w} \pmod P$ and $(HS_w^{RA_w})^{RB_w} \pmod P$ are equal, the minimum intended value $V_{MIN}$ is equal to or greater than $V_{w+1}$, whereas when they differ, the value $V_{MIN}$ equal to or smaller than $V_w$. If they are equal, w+1 is substituted for the variable $W_{min}$, and if they differ, w is substituted for the variable $w_{max}$, after which the above manipulation is repeated. By repeating the manipulation about log M times, $w_{max}=W_{min}(=MIN)$ is obtained. The value $V_{MIN}$ thus obtained is the minimum intended value. In the following description, MIN will be used as the element number corresponding to $V_{MIN}$ in the sequences of information $s_i$ and $t_i$ as in the case of FIG. 6.

After detecting the minimum intended value $V_{MIN}$, the quantitative competition apparatuses 15A, 15B and 15C send $a_j$, $Seq_{s,MIN}$ and $RA_{MIN}$, $b_j$, $Seq_{t,MIN}$ and $RB_{MIN}$, and only $c_j$, respectively, to the bulletin board apparatus 21, y which they are made public. By this, all the users can detect that the user corresponding to that common position of the two sequences holding different pieces of information is the user 11-j having committed $V_{MIN}$ as his intended value.

Suppose, for example, that the quantitative competition apparatus 15B goes down in the above process. Since the information possessed by the quantitative competition apparatus 15B and the information by the quantitative apparatus 15C are essentially identical, the latter can take over the operation of the former.

The fairness of the minimum intended value $V_{MIN}$ made public in the bulletin board apparatus 21 can be verified, for example, through utilization of such secret sharing techniques as disclosed in Shamir. A, "How to Share a Secret," Comm. Assoc. Comput. March., vol. 22, no. 11, pp. 612–613 (November 1979). That is, for the values $H(A_j)$, $H(B_j)$ and $H(C_j)$ committed by the user, the user's committed values $A_j$, $B_j$ and $C_j$ can be disclosed by the cooperation of at least two of the three quantitative competition apparatuses. That is, $H(Vmin\|A_j*B_j*C_j)$ can be verified.

After sending the concatenation elements $Seq_{s,MIN}$ and $Seq_{s,MIN}$ from the quantitative competition apparatuses 15A and 15B to the bulletin board apparatus 21 for publication, that one of $Seq_{s,z}$ and $Seq_{t,z}$ (where z=1, 2, . . . , MIN) which was used for quantitative competition may be sent to the bulletin board apparatus 21 to reveal that $V_{MIN}$ is valid.

As described above, according to the present invention, the quantitative competition apparatuses 15A and 15B extract from the respective sequences $s_i$ and $t_i$ (where i=1, . . . , N) the elements $s_{i,w}$ and $t_{i,w}$ corresponding to the value w specified by the bulletin board apparatus 21, then create the element concatenations $Seq_{s,w}$ and $Seq_{t,w}$ with the extracted elements arranged in predetermined orders, then compare the element concatenations without revealing them, then decide whether there is a user having his intended value equal to or smaller than $V_w$ (equal to or greater than $V_w$ in the case of detecting the maximum value) depending on whether the concatenations are equal or different, and change the value w based on the result of decision. The quantitative competition apparatuses 15A and 15B need not always use the modular exponents $CA_w=HS_w^{RA_w} \pmod P$ and $CB_w=HT_w^{RB_w} \pmod P$, in which case they generate only $HS_w=h(Seq_{s,w})$ and $HT_w=h(Seq_{t,w})$ in steps S2A and 2B in FIG. 7, then send them to the bulletin board apparatus 21, and in step S4 compare them to decide whether they match each other. In this instance, however, if each element of the sequences $s_i$ and $t_i$ is simple-configured with one bit, for instance, then the element concatenation $Seq_{s,w}$ becomes simple, for example, (0‖1‖1‖0‖1‖0‖0). By producing the concatenation $Seq_{s,w}$ of an arbitrary bit string and calculating its hash value, it becomes easy to find, by trial and error, a bit string that matches the published $HS_w=h(Seq_{s,w})$. Therefore, too much a simple element configuration is not preferable in terms of security. On the other hand, in the case of hiding the values $HS_w$ and $HT_w$ by concatenating them with the random numbers $RA_w$ and $RB_w$, respectively, and hashing them as in the FIG. 7 embodiment, the 1-bit elements of the sequences $s_i$ and $t_i$ do not present any problem in terms of security. The 1-bit configuration of each element of the sequences $s_i$ and $t_i$ permits reduction of the amount of data for the encrypted information $E_A(s_i\|R1_i)$ and $E_B(t_i\|R2_i)$ that are sent from the user apparatus to the quantitative competition apparatuses 15A and 15B—this provides the advantage of decreasing the channel capacity.

In the case of sending the hash values for verification use $H1_i=h(s_i\|R1_i)$ and $H2_i=h(t_i\|R2_i)$ to the bulletin board apparatus 21, too, the random numbers R1i and R2i are intended to increase security, and hence they need not always to be used. Accordingly, the hash values can be sent as $H1_i=h(s_i)$ and $H2_i=h(t_i)$ to the bulletin board apparatus 21.

Further, the above embodiments have been described to use the one-way functions for comparing the element concatenations $\text{Seq}_{s,w}$ and $\text{Seq}_{t,w}$ without revealing their values, but it is also possible to encrypt the concatenations $\text{Seq}_{s,w}$ and $\text{Seq}_{t,w}$ by the same key and send the encrypted values to the bulletin board apparatus 21 for comparison.

In the first and third embodiments, for example, in the case of calculating the minimum value, it is possible to use a predetermined common one-way function for the two sequences of information $s_i$ and $t_i$ that are generated in the information sequence generating part 33 and determine seed values $s'_i$ and $t'_i$ that provide $F^d(s'_i) \neq F^d(t'_i)$ (where $d=0, \ldots, M-vi$) and $F^e(S'_i) \neq F^e(t'_i)$ (where $e=M-vi+1, \ldots, M-1$) for the intended value. For example, $F^3(s'_i)$ is a multi-function representing $F(F(F(s'_i)))$. Accordingly, the sequences of information $s_i$ and $t_i$ become as follows:

$$s_i = \{s_{i,1}=F^{M-1}(s'_i), s_{i,2}=F^{M-2}(s'_i), \ldots, s_{i,vi-1}=F^{M-vi+1}(s'_i), s_{i,vi}=F^{M-vi}(s'_i), \ldots, s_{i,M-1}=F(s'_i), s_{i,M}=s'_i\}$$

$$t_i = \{t_{i,1}=F^{M-1}(t'_i), t_{i,2}=F^{M-2}(t'_i), \ldots, t_{i,vi-1}=F^{M-vi+1}(t'_i), t_{i,vi}=F^{M-vi}(t'_i), \ldots, t_{i,M-1}=F(t'_i), t_{i,M}=s'_i\}$$

With this sequence generating scheme, when the seed values $s'_i$ and $t'_i$, all the elements $s_{i,1}, \ldots, s_{i,M}$ and $t_{i,1}, \ldots, t_{i,M}$ can be calculated using the common one-way function. Accordingly, all the elements of the sequences of information $s_i$ and $t_i$ need not be incorporated in the encrypted sequences of information $E_A(s_i\|R1_i)$ and $E_B(t_i\|R2_i)$ that are sent from the user apparatus to the quantitative competition apparatuses 15A and 15B, but instead by sending the encrypted sequences of information with only seed values $s'_i$ and $t'_i$ incorporated therein, that is, $E_A(s'_i\|R1_i)$ and $E_B(t'_i\|R2_i)$, the quantitative competition apparatuses 15A and 15B can generate the sequences of information $s_i$ and $t_i$ from the seed values $s'_i$ and $t'_i$ through utilization of the common one-way function F.

A description will be given of how to determine the multi-function $F(x)$ for generating the sequences of information $s_i$ and $t_i$ based on the seed values $s'_i$ and $t'_i$ and the seed values.

The user apparatus 11-$i$ calculates primes p and q of proper sizes and calculates a composite number n=p*q. The composite number n is one that us used in the RSA cryptosystem based on the factoring problem. From the security point of view, it is preferable that the primes p and q have sizes of about 512 or 1024 bits and that p−1 and q−1 have large prime factors.

Then, the user apparatus 11-$i$ generates random numbers $a_k$ of values in the range of between 0 to n−1 for k=0 to m, and creates a polynomial $$F(x) = a_m * x^m + a_{m-1} * x^{m-1} + \ldots + a_1 * x + a_0.$$

Next, the user apparatus 11-$i$ generates random numbers $s'_i$ and $t'_i$ of values in the range of between 0 and n−1, and set them as the seed values. After this, the user apparatus finds out a collision with $F(x) \bmod n$, for example, by such a scheme as described below.

Step 1: calculate $F^u(s'_i) \bmod n$ for u=1, 2, ..., c, and stores the results of sequential calculations $F(s'_i), F^2(s'_i), \ldots, F^c(s'_i)$, where c is a parameter that the user determines and $F^u(x)$ is a u-fold multi-function.

Step 2: Set flag=0, v=0 and mx=c', where c' is a parameter that the user determines.

Step 3: Calculates $F^v(t'_i) \bmod n$, then stores the result of calculation, then makes a check to see if the calculated value matches any one of the values $F(s'i), F^2(s'i), \ldots, F^c(s'i)$ stored in step 1, and if any, set flag=1.

Step 4: If flag=1 or v=c', discontinue the procedure, or if not, increment v by one and return to step S3.

In this case, the final state of flag=1 is equivalent to the detection of a collision. In general, however, since $F(x) \bmod n$ covers a wide range (approximately 1024 or 2048 bits), it is expected that the collision will not readily be found. By selecting a natural number n' smaller than n and replacing the original output $F(x) \bmod n$ with $(F(x) \bmod n) \bmod n'$ so as to reduce the value of $F(x) \bmod n$ to a narrow range, the collision could be detected with more ease. In this case, for example, $(35 \bmod 15) \bmod 3$ is 5 mod 3=2. At any rate, the following description will be given on the assumption that the collision has been detected.

Assuming that $F^{u'-1}(s'_i) \neq F^{v'-1}(t'_i)$, $F^{u'}(s'_i) = F^{v'}(t'_i)$, and the intended value $V_{vi}$ is w-th counted from the minimum value $V_1$, the sequences of information $s_i$ and $t_i$ can be constructed if $M-w+1 \leq u'$ and $M-w+1 \leq v'$. That is, the sequences of information need only to be set as follows:

$$s_i = \{s_{i,1}=F^{u'+w-2}(s'_i), \ldots, s_{i,w}=F^{u'-1}(s'_i), \ldots, s_{i,M}=F^{u'+w-M-1}(s'_i)\}$$

$$t_i = \{t_{i,1}=F^{u'+w-2}(t'_i), \ldots, t_{i,w}=F^{u'-1}(t'_i), \ldots, t_{i,M}=F^{u'+w-M-1}(t'_i)\}$$

Incidentally, the reason for which the composite number n, relying on the factoring problem, is used in mod n is to inhibit easy factorization of a polynomial $F'(x)=F(x)/(x-x')$ when the constant x' is present. For example, noting an element $s_{i,k}$ of the sequence of information $s_i$, it can be seen that the intended value of the user 11-$i$ is not $V_k$ when there is present only one z that satisfies $F(z)=s_{i,k} \bmod n$.

With the above-mentioned collision search scheme, since there is a fear of leakage of information about the intended value, care should be taken in choosing the number n'. Conversely, when the conditions of the sequences of information $s_i$ and $t_i$ are not met, collision search steps 1 to 4 need only to be performed again.

A hash function may be used as the function $F(x)$. In such an instance, too, it is expected that the collision cannot readily be detected, but by reducing the output to a narrow range by the above-described scheme, the collision can be detected with ease. In some cases, however, it may become necessary to pad the input in association with the size of the output to be reduced.

With the method of sending only the seed value as described above, it is possible to reduce the channel capacity and communication time for sending the sequence of information to each quantitative competition apparatus. Further, even if the number M of values choosable as the intended value $V_{vi}$ is increased, the channel capacity remains unchanged since only the seed value is sent. On the other hand, in the case of using random numbers to generate the sequences of information as in the first embodiment, as the number M of values choosable as the intended value, the number of elements of each sequence of information increases accordingly, causing an increase in the channel capacity.

In the case of calculating the maximum value, too, all the elements of each sequence of information may be generated from the seed value through the use of the one-way function.

While the above embodiments determine the minimum value $V_{MIN}$ among all of the users' intended values $V_{vi}$, the maximum intended value $V_{MAX}$ can similarly be determined. In this instance, the two sequences of information $s_i$ and $t_i$ are adapted so that they differ in the information corresponding to the values equal to or greater than $V_1$ and equal to or smaller than $V_{vi}$ and that they are common in the information corresponding to the values equal to or greater than $V_{vi+1}$ and equal to or smaller than $V_M$. Further, in the comparisons between $Seq_{s,w}$ and $Seq_{t,w}$, between $HS_w=h'(Seq_{s,w})$ and $HT_w=h'(Seq_{t,w})$ and between $(HT_w^{RBw})^{RAw}$ mod P and $(HS_w^{RAw})^{RBw}$ mod P which correspond to the chosen value w, if they differ, it is judged that there is a user who has committed his intended value equal to or larger than $V_w$, and if they equal, it is judged that there is no user who has committed his intended value equal to or larger than $V_w$. When they equal, w−1 is substituted for $W_{max}$, and when they differ, w is substituted for $w_{min}$, after which the same processing as described above needs only to be repeated.

By determining the value w in the manner described above, the minimum or maximum value can be calculated efficiently, but the quantitative competition may also be conducted, for example, by sequentially changing the value w from the value $V_1$ or $V_M$. Moreover, it is also possible that one quantitative competition apparatus determines the first value of w, sends it via the bulletin board apparatus 21 to the other quantitative competition apparatus, then receives necessary information from the bulletin board apparatus 21, and performs the processing shown in FIG. 7.

EFFECT OF THE INVENTION

As described above, the present invention permits implementation of a highly invulnerable quantitative competition method in which simply by sending from the user the information about his intended value to each quantitative competition apparatus and the bulletin board apparatus only once, the maximum or minimum value can be specified efficiently and, if necessary, only the user having committed the maximum or minimum value as his intended value can be specified.

What is claimed is:

1. A quantitative competition method for generating a sealed-bid auction in which a minimum value $V_{MIN}$ of all intended values $V_{vi}$ selected from among M monotone increasing values $V_w$, where w=1, 2, . . . , M, in a range of predetermined lower-limit and upper-limit values $V_1$ and $V_M$, respectively, and only a user j having selected said minimum value $V_{MIN}$ as an intended value $V_{vi}$ are specified by a plurality of user apparatuses i, where i=1, . . . , N, said N being an integer equal to or larger than 2, first and second quantitative competition apparatuses, and a bulletin board apparatus that makes public information received from said plurality of user apparatuses and said first and second quantitative competition apparatuses, said method comprising:

Step (a) of generating two M-element sequences of information $s_i$ and $t_i$, i=1, 2, . . . , N, by each of said user apparatuses i in response to said intended value $V_{vi}$ input by a user, such that elements $s_{i,m}$ and $t_{i,m}$ of the sequences of information $s_i$ and $t_i$ equal each other in a range from said lower-limit value $V_1$ inclusive to said intended value $V_{vi}$ exclusive and differ from each other in a range from said intended value $V_{vi}$ inclusive to said upper-limit value $V_M$ inclusive; and secretly sending information about said two M-element sequences of information $s_i$ and $t_i$ to said first and second quantitative competition apparatuses, respectively, said M representing a number of values selectable as said intended values in a range from said lower-limit value $V_1$ inclusive to said upper-limit value $V_M$ inclusive;

Step (b) of extracting elements $s_{i,w}$ of said M-element sequences by said first quantitative competition apparatus, corresponding to a given value $V_w$ equal to or larger than said lower-limit value $V_1$ and equal to or smaller than said upper-limit value, said elements $s_{i,w}$ of said M-element sequences of information $s_i$ sent from said all user apparatuses which correspond to w; and generating an element concatenation $Seq_{s,w}=s_{1,w}\|s_{2,w}\| \ldots \|s_{N,w}$ in which said extracted elements $s_{i,w}$ are arranged in a predetermined order, said $\|$ representing the concatenation of data;

Step (c) of extracting elements $t_{i,w}$ of said M-element sequences by said second quantitative competition apparatus corresponding to said given value $V_w$, said elements $t_{i,w}$ of said M-element sequences of information $t_i$ sent from said all user apparatuses which correspond to said value w; and generating an element concatenation $Seq_{t,w}=t_{1,w}\|t_{2,w}\| \ldots \|t_{N,w}$ in which said extracted elements $t_{i,w}$ are arranged in a predetermined order;

Step (d) of comparing said element concatenations $Seq_{s,w}$ and $Seq_{t,w}$ without revealing their values by said bulletin board apparatus, deciding presence or absence of a user having selected an intended value equal to or smaller than said value $V_w$, depending on whether said concatenations $Seq_{s,w}$ and $Seq_{t,w}$ differ or equal; and determining determines a minimum intended value $V_{MIN}$ by changing said value w based on said deciding presence or absence and making a value MIN public; and Step (e) of sending element concatenations $Seq_{s,MIN}$ and $Seq_{t,MIN}$ from said first and second quantitative competition apparatuses, respectively, to said bulletin board apparatus to make said element concatenations $Seq_{s,MIN}$ and $Seq_{t,MIN}$ public, whereby allowing each user to identify user j who committed the minimum intended value $V_{MIN}$ by finding j which satisfies $s_{j,MIN} \neq t_{j,MIN}$ of the corresponding elements in said element concatenations $Seq_{s,MIN}$ and $Seq_{t,MIN}$.

2. The method of claim 1, wherein: said Step (a) includes generating random numbers $R1_i$ and $R2_i$ secretly sending a pair of information $(R1_i, s_i)$ from said user apparatus of said each user i to said first quantitative competition apparatus and a pair of information $(R2_i, t_i)$ from said user apparatus of said each user i to said second quantitative competition apparatus; and calculating hash values $H1_i=h(R1_i\|s_i)$ and $H2_i=h(R2_i\|t_i)$ of concatenations $R1_i\|s_i$ and $R2_i\|t_i$ of said pairs of information $(R1_i, s_i)$ and $(R2_i, t_i)$ by a hash function h by said user apparatus, and sending said hash values $H1_i$ and $H2_i$ to said bulletin board apparatus; and said Step (d) includes making public said hash values $H1_i$ and $H2_i$, where i=1, 2, . . . , N, as commitments of said all users by said bulletin board apparatus.

3. The method of claim 2, wherein: said Step (b) includes calculating a hash value $HS_w=h(Seq_{s,w})$ of said element concatenation $Seq_{s,w}$ by said hash function h by said first quantitative competition apparatus; and sending said hash value $HS_w$ to said bulletin board apparatus;

said Step (c) includes calculating a hash value $HT_w=h(Seq_{t,w})$ of said element concatenation $Seq_{t,w}$ by said hash function h by said second quantitative competition apparatus; and sending said hash value $HT_w$ to said bulletin board apparatus; and said Step (d) includes making public and comparing said hash values $HS_w$ and $HT_w$ received from said first and second quantitative competition apparatuses by said bulletin board apparatus; deciding presence or absence of a user having selected an intended value equal to or smaller than said value $V_w$, depending on whether said hash values $HS_w$ and $HT_w$ differ or equal; and determines determining said minimum intended value $V_{MIN}$ by changing said value w based on said deciding said presence or absence.

4. The method of claim 2, wherein:

said first and second quantitative competition apparatuses have stored therein a prime P made public previously by said bulletin board apparatus, said prime P being a prime such that P−1 has a large prime as its divisor, and said first and second quantitative competition apparatuses having selected a common integral value w;

said Step (b) includes calculating a hash value $HS_w=h'(Seq_{s,w})$ of said element concatenation $Seq_{s,w}$ by a hash function h' that maps an arbitrary integer over a finite field uniquely and randomly by said first quantitative competition apparatus; generating a random number $RA_w$; calculating a hash value $HA_w=h(RA_w\|HS_w)$ of a concatenation $RA_w\|HS_w$ by said hash function h; calculating $HS_w^{RAw} \pmod P$; and sending a pair ($HA_w$, $HS_w^{RAw} \pmod P$) of said hash value $HA_w$ and said value $HS_w^{RAw} \pmod P$ to said bulletin board apparatus;

said Step (c) includes calculating a hash value $HT_w=h'(Seq_{t,w})$ of said element concatenation $Seq_{t,w}$ by a hash function h' by said second quantitative competition apparatus; generating a random number $RB_w$; calculating a hash value $HB_w=h(RB_w\|HT_w)$ of a concatenation $RB_w\|HT_w$ by said hash function h; calculating $HT_w^{RBw} \pmod P$; and sending a pair ($HB_w$, $HT_w^{RBw} \pmod P$) of said hash value $HB_w$ and said value $HT_w^{RBw} \pmod P$ to said bulletin board apparatus; and said Step (d) includes reading said $HT_w^{RBw} \pmod P$ from said bulletin board apparatus by said first quantitative competition apparatus, and calculating and sending $(HT_w^{RBw})^{RAw} \pmod P$ to said bulletin board apparatus; reading said $HS_w^{RAw} \pmod P$ from said bulletin board apparatus by said second quantitative apparatus, and calculating and sending $(HS_w^{RAw})^{RBw} \pmod P$ to said bulletin board apparatus; and making public and comparing said $(HS_w^{RAw})^{RBw} \pmod P$ and $(HT_w^{RBw})^{RAw} \pmod P$ received from said first and second quantitative competition apparatuses; deciding presence or absence of a user having selected an intended value equal to or smaller than said value $V_w$, depending on whether said $(HS_w^{RAw})^{RBw} \pmod P$ and $(HT_w^{RBw})^{RAw} \pmod P$ differ or equal; and determining said minimum intended value $V_{MIN}$ by changing said value w based on said deciding presence or absence.

5. The method of claim 3 or 4, wherein $w_{min}$ and $w_{max}$ represent variables, said first and second quantitative competition apparatuses have said value w in common as a maximum integer equal to or smaller than $(w_{min}+w_{max})/2=(1+M)/2$ where $w_{min}=1$ and $w_{max}=M$; and said Step (d) includes substituting w with said variable $w_{max}$ or substituting w+1 with said variable $w_{min}$, depending on presence or absence of a user having selected an intended value equal to or smaller than said value $V_w$; said Steps (b) and (c) are repeated until $w_{max}=w_{min}=MIN$, thereby obtaining said minimum intended value $V_{MIN}$ corresponding to said value MIN; and upon each repetition of said Steps (b) and (c), said bulletin board apparatus makes public the results of calculation.

6. The method of claim 4, wherein each element of said M-element sequences of information $s_i$ and $t_i$ is a one-bit element.

7. The method of claim 4 or 6, wherein said step (e) includes sending random numbers $RA_{MIN}$ and $RB_{MIN}$ from said first and second quantitative competition apparatus to said bulletin board apparatus making said random numbers $RA_{MIN}$ and $RB_{MIN}$ public.

8. The method of any one of claims 1 to 4, wherein: L quantitative competition apparatuses are provided, said L being equal to or larger than 3;

said Step (a) includes generating L sequences of information $s_{ik}$ where k=1, 2, . . . , L, by said each user apparatus, when supplied with said value $V_{vi}$, said L sequences of information $s_{ik}$ being equal in all pieces of information corresponding to values equal to or greater than $V_1$ and smaller than $V_{vi}$ but different in all pieces of information corresponding to values equal to or larger than $V_{vi}$ and equal to or smaller than $V_M$ and such that said value $V_{vi}$ can be detected when at least two sequences $s_{ia}$ and $s_{ib}$ of said L sequences of information $s_{ik}$ are known, where a≠b; and secretly sending said L sequences of information $s_{ik}$ to a k-th quantitative competition apparatus; and wherein two of said L quantitative competition apparatuses conduct quantitative competition, and when one of said two quantitative competition apparatuses goes down, a remaining operable quantitative competition apparatuses is used to continue said quantitative competition.

9. The method of claim 1, wherein said Step (a) includes secretly sending seed values $s'_i$ and $t'_i$, by said each user apparatus, as information corresponding to said two sequences of information $s_i$ and $t_i$ to said first and second quantitative competition apparatuses, respectively; wherein letting vi represent the element number corresponding to said intended value $V_{vi}$, said seed values $s'_i$ and $t'_i$ are determined by a one-way function F so that $F^d(s'_i)=F^d(t'_i)$, where d=0, 1, . . . , M−vi, and $F^e(s'_i)=F^e(t'_i)$, where e=M−vi+1, . . . , M−1; and said two sequences of information $s_i$ and $t_i$ are given by the following equations $$s_i=\{s_{i,1}=F^{M-1}(s'_i), s_{i,2}=F^{M-2}(s'_i), \ldots, s_{i,vi-1}=F^{M-vi+1}(s'_i), s_{i,vi}=F^{M-vi}(s'_i), \ldots, s_{i,M-1}=F(s'_i), s_{i,M}=s'_i\} \text{ and}$$

$$t_i=\{t_{i,1}=F^{M-1}(t'_i), t_{i,2}=F^{M-2}(t'_i), \ldots, t_{i,vi-1}=F^{M-vi+1}(t'_i), t_{i,vi}=F^{M-vi}(t'_i), \ldots, t_{i,M-1}=F(t'_i), t_{i,M}=s'_i\}.$$

10. The method of claim 1, wherein said Step (a) includes:

generating initial random numbers $R1_i$, $R2_i$, $ca_i$, $cb_i$, $s_{i,M+1}$ and $t_{i,M+1}$ by said each user apparatus; and setting an initial value of m at M, and performing, with respect to the element number vi corresponding to said intended value $V_{vi}$, the following calculations by said each user apparatus $$s_{i,m}=h(s_{i,m+1}\|h^{M+1-m}(ca_i)\|h^{M+1-m}(cb_i)) \text{ and}$$

$$t_{i,m}=h(t_{i,m+1}\|h^{M+1-m}(ca_i)\|h^{M+1-m}(cb_i))$$

sequentially for m=M, M−1, . . . , vi to provide subsequences $s_{i,m}\neq t_{i,m}$; calculating a sequence element for m=vi−1

$$s_{i,m}=t_{i,m}=h(s_{i,m-1}\|t_{i,m-1}\|h^{M+1-m}(ca_i)\|h^{M+1-m}(cb_i))$$

and a sequence element for m=vi−2, vi−3, . . . , 0

$$s_{i,m}=t_{i,m}=h(s_{i,m-1}\|h^{M+1-m}(ca_i)\|h^{M+1-m}(cb_i))$$

to provide subsequences $s_{i,m}=t_{i,m}$; and obtaining sequences of said elements $s_{i,m}$ and $t_{i,m}$ as said sequences of information $s_i$ and $t_i$, and a value $s_{i,0}$ for m=0; and wherein said Step (a) further includes encrypting $R1_i$ and $s_i=\{s_{i,1}, s_{i,2}, \ldots, s_{i,M}\}$ by an encryption function $E_A$ by said each user apparatus, sending a resulting $E_A(s_i\|R1_i)$ to said first quantitative competition apparatus, encrypting $R2_i$ and $t_i=\{t_{i,1}, t_{i,2}, \ldots, t_{i,M}\}$ by an encryption function $E_B$, and sending a resulting $E_B(t_i\|R2_i)$ to said second quantitative competition apparatus; and sending $H1_i=h(s_i\|R1_i)$, $H2_i=h(t_i\|R2_i)$, $s_{i,0}$, $h^{M+1}(ca_i)$ and $h^{M+1}(cb_i)$ from said each user apparatus to said bulletin board to make said $H1_i=h(s_i\|R1_i)$, $H2_i=h(t_i\|R2_i)$, $s_{i,0}$, $h^{M+1}(ca_i)$ and $h^{M+1}(cb_i)$ public.

11. A method by which said each user apparatus in said quantitative competition method of claim 1 registers an intended value $V_{vi}$ selected from among M integral values defined by upper and lower limits $V_M$ and $V_1$ for comparison, said M being an integer equal to or larger than 2, said method comprising the steps of:

(a) responding to input of said intended value $V_{vi}$ to generate two M-element sequences of information $s_i$ and $t_i$, wherein corresponding elements of said two M-element sequences of information $s_i$ and $t_i$ equal each other in a range from said value $V_1$ inclusive to said value $V_{vi}$ exclusive and differ from each other in a range from said value $V_{vi}$ inclusive to said value $V_M$ inclusive;

(b) responding to the input of said two M-element sequences of information $s_i$ and $t_i$ to calculate one-way functions of said sequences of information $s_i$ and $t_i$ and sending calculation results $H1_i$ and $H2_i$ to a bulletin board apparatus; and (c) sending said sequence of information $s_i$ to a first quantitative competition apparatus, said sequence of information $t_i$ to a second quantitative competition apparatus, and said $H1_i$ and $H2_i$ to said bulletin board apparatus.

12. A quantitative competition method for generating a sealed-bid auction in which a maximum value $V_{MAX}$ of all intended values $V_{vi}$ selected from among M monotone increasing values $V_w$, where $w=1, 2, \ldots, M$, in a range of predetermined lower-limit and upper-limit values $V_1$ and $V_M$, respectively, and only a user j having selected said maximum value $V_{MAX}$ as an intended value $V_{vi}$ are specified by a plurality of user apparatuses i, where $i=1, \ldots, N$, said N being an integer equal to or larger than 2, first and second quantitative competition apparatuses, and a bulletin board apparatus that makes public information received from said plurality of user apparatuses and said first and second quantitative competition apparatuses, said method comprising:

Step (a) of generating two M-element sequences of information $s_i$ and $t_i$, $i=1, 2, \ldots, N$, by each of said user apparatuses i in response to said intended value $V_{vi}$ input by a user, such that elements $s_{i,m}$ and $t_{i,m}$ of the sequences of information $s_i$ and $t_i$ equal each other in a range from said lower-limit value $V_1$ inclusive to said intended value $V_{vi}$ inclusive and differ from each other in a range from said intended value $V_{vi}$ exclusive to said upper-limit value $V_M$ inclusive; and secretly sending information about said two M-element sequences of information $s_i$ and $t_i$ to said first and second quantitative competition apparatuses, respectively, said M representing a number of values selectable as said intended values in a range from said lower-limit value $V_1$ inclusive to said upper-limit value $V_M$ inclusive;

Step (b) of extracting elements $s_{i,w}$ of said M-element sequences by said first quantitative competition apparatus, corresponding to a given value $V_w$ equal to or larger than said lower-limit value $V_1$ and equal to or smaller than said upper-limit value, said elements $s_{i,w}$ of said M-element sequences of information $s_i$ sent from said all user apparatuses which correspond to w; and generating an element concatenation $Seq_{s,w}=s_{1,w}\|s_{2,w}\| \ldots \|s_{N,w}$ in which said extracted elements $s_{i,w}$ are arranged in a predetermined order, said $\|$ representing the concatenation of data;

Step (c) of extracting elements $t_{i,w}$ of said M-element sequences by said second quantitative competition apparatus, corresponding to said given value $V_w$, said elements $t_{i,w}$ of said M-element sequences of information $t_i$ sent from said all user apparatuses which correspond to said value w; and generating an element concatenation $Seq_{t,w}=t_{1,w}\|t_{2,w}\| \ldots \|t_{N,w}$ in which said extracted elements $t_{i,w}$ are arranged in a predetermined order;

Step (d) of comparing said element concatenations $Seq_{s,w}$ and $Seq_{t,w}$ without revealing their values by said bulletin board apparatus, deciding presence or absence of a user having selected an intended value equal to or larger than said value $V_w$, depending on whether said concatenations $Seq_{s,w}$ and $Seq_{t,w}$ differ or equal; and determining a maximum intended value $V_{MAX}$ by changing said value w based on said deciding presence or absence and makes a value MAX public; and Step (e) of sending element concatenations $Seq_{s,MIN}$ and $Seq_{t,MIN}$ from said first and second quantitative competition apparatuses respectively, to said bulletin board apparatus to make said element concatenations $Seq_{s,MIN}$ and $Seq_{t,MIN}$ public, whereby allowing each user to identify user j who committed the maximum intended value $V_{MAX}$ by finding j which satisfies $s_{j,MAX} \neq t_{j,MAX}$ of the corresponding elements in said element concatenations $Seq_{s,MAX}$ and $Seq_{t,MAX}$.

13. The method of claim 12, wherein:

said Step (a) includes generating random numbers $R1_i$ and $R2_i$ secretly sending a pair of information $(R1_i, s_i)$ from said user apparatus of said each user i to said first quantitative competition apparatus, and a pair of information $(R2_i, t_i)$ from said user apparatus of said each user i to said second quantitative competition apparatus; and calculating hash values $H1_i=h(R1_i\|s_i)$ and $H2_i=h(R2_i\|t_i)$ of concatenations $R1_i\|s_i$ and $R2_i\|t_i$ of said pairs of information $(R1_i, s_i)$ and $(R2_i, t_i)$ by a hash function h by said user apparatus, and sending said hash values $H1_i$ and $H2_i$ to said bulletin board apparatus; and said Step (d) includes making public said hash values $H1_i$ and $H2_i$, where $i=1, 2, \ldots, N$, as commitments of said all users by said bulletin board apparatus.

14. The method of claim 13, wherein:

said Step (b) includes calculating a hash value $HS_w=h(Seq_{s,w})$ of said element concatenation $Seq_{s,w}$ by said hash function h by said first quantitative competition apparatus; and sending said hash value $HS_w$ to said bulletin board apparatus;

said Step (c) includes calculating a hash value $HT_w=h(Seq_{s,w})$ of said element concatenation $Seq_{s,w}$ by said hash function h by said second quantitative competition apparatus; and sending said hash value $HT_w$ to said bulletin board apparatus; and said Step (d) includes making public and comparing said hash values $HS_w$ and $HT_w$ received from said first and second quantitative competition apparatuses by said bulletin board apparatus; deciding presence or absence of a user having selected an intended value equal to or larger than said value $V_w$, depending on whether said hash values $HS_w$ and $HT_w$ differ or equal; and determining said maximum intended value $V_{MAX}$ by changing said value w based on said deciding presence or absence.

15. The method of claim 13, wherein:

said first and second quantitative competition apparatuses have stored therein a prime P made public previously by said bulletin board apparatus, said prime P being a prime such that P−1 has a large prime as its divisor, and said first and second quantitative competition apparatuses having selected a common integral value w;

said Step (b) includes calculating a hash value $HS_w=h'(Seq_{s,w})$ of said element concatenation $Seq_{s,w}$ by a hash function h' that maps an arbitrary integer over a finite field uniquely and randomly by said first quantitative competition apparatus; generating a random number $RA_w$; calculating a hash value $HA_w=h(RA_w\|HS_w)$ of a concatenation $RA_w\|HS_w$ by said hash function h; calculating $HS_w^{RAw}(\bmod P)$; and sending a pair ($HA_w$, $HS_w^{RAw}(\bmod P)$) of said hash value $HA_w$ and said value $HS_w^{RAw}(\bmod P)$ to said bulletin board apparatus;

said Step (c) includes calculating a hash value $HT_w=h'(Seq_{t,w})$ of said element concatenation $Seq_{t,w}$ by a hash function h' by said second quantitative competition apparatus; generating a random number $RB_w$; calculating a hash value $HB_w=h(RB_w\|HT_w)$ of a concatenation $RB_w\|HT_w$ by said hash function h; calculating $HT_w^{RBw}(\bmod P)$; and sending a pair ($HB_w$, $HT_w^{RBw}(\bmod P)$) of said hash value $HB_w$ and said value $HT_w^{RBw}(\bmod P)$ to said bulletin board apparatus; and said Step (d) includes reading said $HT_w^{RBw}(\bmod P)$ from said bulletin board apparatus by said first quantitative competition apparatus, and calculating and sending $(HT_w^{RBw})^{RAw}(\bmod P)$ to said bulletin board apparatus; reading said $HS_w^{RAw}(\bmod P)$ from said bulletin board apparatus by said second quantitative competition apparatus, and calculating and sending $(HS_w^{RAw})^{RBw}(\bmod P)$ to said bulletin board apparatus and making public and comparing said $(HS_w^{RAw})^{RBw}(\bmod P)$ and $(HT_w^{RBw})^{RAw}(\bmod P)$ received from said first and second quantitative competition apparatuses; deciding presence or absence of a user having selected an intended value equal to or larger than said value $V_w$, depending on whether said $(HS_w^{Raw})^{RBw}(\bmod P)$ and $(HT_w^{RBw})^{RAw}(\bmod P)$ differ or equal; and determining said maximum intended value $V_{MAX}$ by changing said value w based on said deciding presence or absence.

16. The method of claim 14 or 15, wherein: letting $w_{min}$ and $w_{max}$ represent variables of integers 1 to M, said first and second quantitative competition apparatuses have said value w in common as a maximum integer equal to or smaller than $(w_{min}+w_{max})/2(1+M)/2$ where $w_{min}=1$ and $w_{max}=M$; and said Step (d) includes substituting w with said variable $w_{max}$ or substituting w+1 with said variable $w_{min}$, depending on presence or absence of a user having selected an intended value equal to or larger than said value $V_w$; said Steps (b) and (c) are repeated until $w_{max}=w_{min}=MAX$, thereby obtaining said minimum intended value $V_{MAX}$ corresponding to said value MAX; and upon each repetition of said Steps (b) and said bulletin board apparatus makes public the results of calculation.

17. The method of claim 15, wherein each element of said M-element sequences of $s_i$ and $t_i$ is a one-bit element.

18. The method of claim 15 or 17, said step (e) includes sending random numbers $RA_{MIN}$ and $RB_{MIN}$ from said first and second quantitative competition apparatus to said bulletin board apparatus, respectively, making public said random numbers $RA_{MIN}$ and $RB_{MIN}$.

19. The method of any one of claims 12 to 15, wherein:

L quantitative competition apparatuses are provided, said L being equal to or larger than 3;

said Step (a) includes generating L sequences of information $s_{ik}$, where k=1, 2, . . . , L, by said each user apparatus, when supplied with said value $V_{vi}$, said L sequences of information $s_{ik}$ being equal in all pieces of information corresponding to values equal to or greater than $V_1$ and smaller than $V_{vi}$, but different in all pieces of information corresponding to values equal to or larger than $V_{vi}$ and equal to or smaller than $V_M$ and such that said value $V_{vi}$ can be detected when at least two sequences $s_{ia}$ and $s_{ib}$ of said L sequences of information $s_{ik}$ are known, where a≠b; and sending said L sequences of information $s_{ik}$ to a k-th quantitative competition apparatus; and wherein two of said L quantitative competition apparatuses conduct quantitative competition, and when one of said two quantitative competition apparatuses goes down, a remaining operable quantitative competition apparatuses is used to continue said quantitative competition.

20. The method of claim 12, wherein said Step (a) includes secretly sending seed values $s'_i$ and $t'_i$, by said each user apparatus, as information corresponding to said two sequences of information $s_i$ and $t_i$ to said first and second quantitative competition apparatuses, respectively; wherein letting vi represent the element number corresponding to said intended value $V_{vi}$, said seed values $s'_i$ and $t'_i$ are determined by a one-way function F so that $F^d(s'_i)=F^d(t'_i)$, where d=0, 1, . . . , M−vi, and $F^e(s'_i)=F^e(t'_i)$, where e=M−vi+1, . . . , M−1; and said two sequences of information $s_i$ and $t_i$ are given by the following equations $$s_i=\{s_{i,1}=F^{M-1}(s'_i), s_{i,2}=F^{M-2}(s'_i), \ldots, s_{i,vi-1}=F^{M-vi+1}(s'_i), s_{i,vi}=F^{M-vi}(s'_i), \ldots, s_{i,M-1}=F(s'_i), s_{i,M}=s'_i\} \text{ and}$$

$$t_i=\{t_{i,1}=F^{M-1}(t'_i), t_{i,2}=F^{M-2}(t'_i), \ldots, t_{i,vi-1}=F^{M-vi+1}(t'_i), t_{i,vi}=F^{M-vi}(t'_i), \ldots, t_{i,M-1}=F(t'_i), t_{i,M}=s'_i\}.$$

21. The method of claim 12, wherein said Step (a) includes:

generating initial random numbers $R1_i$, $R2_i$, $ca_i$, $cb_i$, $s_{i,M+1}$ and $t_{i,M+1}$ by said each user apparatus; and setting an initial value of m at M, and performing, with respect to the element number vi corresponding to said intended value $V_{vi}$, the following calculations by said each user apparatus $$s_{i,m}=h(s_{i,m+1}\|h^{M+1-m}(ca_i)\|h^{M+1-m}(cb_i)) \text{ and}$$

$$t_{i,m}=h(t_{i,m+1}\|h^{M+1-m}(ca_i)\|h^{M+1-m}(cb_i))$$

sequentially for m=M, M−1, . . . , vi to provide subsequences $s_{i,m}\neq t_{i,m}$; calculating a sequence element for m=vi−1

$$s_{i,m}=t_{i,m}=h(s_{i,m-1}\|t_{i,m-1}\|h^{M+1-m}(ca_i)\|h^{M+1-m}(cb_i))$$

and a sequence element for m=vi−2, vi−3, . . . , 0

$$s_{i,m}=t_{i,m}=h(s_{i,m-1}\|h^{M+1-m}(ca_i)\|h^{M+1-m}(cb_i))$$

to provide subsequences $s_{i,m}=t_{i,m}$; and obtaining sequences of said elements $s_{i,m}$ and $t_{i,m}$ as said sequences of information $s_i$ and $t_i$, and a value $s_{i,0}$ for m=0; and wherein said Step (a) further includes: encrypting $R1_i$ and $s_i=\{s_{i,1}, s_{i,2}, \ldots, s_{i,M}\}$ by an encryption function $E_A$ by said each user apparatus, sending a resulting $E_A(s_i \| R1_i)$ to said first quantitative competition apparatus, encrypting $R2_i$ and $t_i=\{t_{i,1}, t_{i,2}, \ldots, t_{i,M}\}$ by an encryption function $E_B$, and sending a resulting $E_B(t_i \| R2_i)$ to said second quantitative competition apparatus; and sending $H1_i=h(s_i \| R1_i)$, $H2_i=h(t_i \| R2_i)$, $s_{i,0}$, $h^{M+1}(ca_i)$ and $h^{M+1}(cb_i)$ from said each user apparatus to said bulletin board to make said $H1_i=h(s_i \| R1_i)$, $H2_i=h(t_i \| R2_i)$, $s_{i,0}$, $h^{M+1}(ca_i)$ and $h^{M+1}(cb_i)$ public.

22. The method of claim 1 or 12, wherein said Step (a) includes generates generating a random number $r_i$ by said each user apparatus; determining two pieces of random information $a_i$ and $b_i$, where $r_i=a_i*b_i$, said symbol * being a predetermined common operator; sending said pieces of random information $a_i$ and $b_i$ to said first and second quantitative competition apparatuses, respectively; hashes hashing said pieces of random information $a_i$ and $b_i$ by a hash function h; and sending hash values $h(a_i)$, $h(b_i)$ and $h(V_{vi} \| r_i)$ to said bulletin board apparatus; and said Step (e) includes sending said pieces of random information $a_j$ and $b_j$ from said first and second quantitative apparatuses to said bulletin board apparatus making said pieces of random information $a_j$ and $b_j$ public, and verifying, by said each user apparatus, made-public hash values $h(a_j)$ and $h(b_j)$ by using made-public random information $a_j$ and $b_j$ and further verifying whether $h(V_{vj} \| r_i)=h(V_{vj} \| a_j*b_j)$.

23. A method by which said each user apparatus in said quantitative competition method of claim 12 registers an intended value $V_{vi}$ selected from among M integral values defined by upper and lower limits $V_M$ and $V_1$ for comparison, said M being an integer equal to or larger than 2, said method comprising the steps of:

(a) responding to input of said intended value $V_{vi}$ to generate two M-element sequences of information $s_i$ and $t_i$, wherein corresponding elements of said two M-element sequences of information $s_i$ and $t_i$ differ from each other in a range from said value $V_1$ inclusive to said value $V_{vi}$ inclusive and equal each other in a range from a value $V_{vi+1}$ inclusive to said value $V_M$ inclusive;

(b) responding to the input of said two M-element sequences of information $s_i$ and $t_i$ to calculate one-way functions of said sequences of information $s_i$ and $t_i$ and sending calculation results $H1_i$ and $H2_i$ to a bulletin board apparatus; and (c) sending said sequence of information $s_i$ to a first quantitative competition apparatus, said sequence of information $t_i$ to a second quantitative competition apparatus, and said $H1_i$ and $H2_i$ to said bulletin board apparatus.

* * * * *